US010499326B2

(12) United States Patent
Qi et al.

(10) Patent No.: US 10,499,326 B2
(45) Date of Patent: Dec. 3, 2019

(54) USER EQUIPMENT PAGING METHOD AND MME

(71) Applicant: Huawei Technologies Co., Ltd., Shenzhen (CN)

(72) Inventors: Caixia Qi, Shanghai (CN); Shoucai Zhu, Shanghai (CN); Yanping Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 42 days.

(21) Appl. No.: 15/648,041

(22) Filed: Jul. 12, 2017

(65) Prior Publication Data

US 2017/0311247 A1  Oct. 26, 2017

Related U.S. Application Data

(63) Continuation of application No. PCT/CN2015/070529, filed on Jan. 12, 2015.

(51) Int. Cl.
*H04W 48/18* (2009.01)
*H04W 28/02* (2009.01)
*H04W 68/04* (2009.01)
*H04L 12/70* (2013.01)
*H04W 8/06* (2009.01)
(Continued)

(52) U.S. Cl.
CPC ....... *H04W 48/18* (2013.01); *H04W 28/0284* (2013.01); *H04W 68/04* (2013.01); *H04L 2012/5603* (2013.01); *H04W 8/065* (2013.01); *H04W 36/0022* (2013.01);
(Continued)

(58) Field of Classification Search
CPC . H04W 48/18; H04W 68/04; H04W 28/0284; H04W 68/08; H04W 68/06; H04W 92/24; H04W 36/0022; H04W 8/065; H04L 2012/5603
See application file for complete search history.

(56) References Cited

U.S. PATENT DOCUMENTS

2007/0077946 A1   4/2007   Benco et al.
2010/0159960 A1   6/2010   Chou et al.
(Continued)

FOREIGN PATENT DOCUMENTS

CN   101707796 A   5/2010
CN   101827430 A   9/2010
(Continued)

OTHER PUBLICATIONS

Machine Translation and Abstract of Chinese Publication No. CN101707796, May 12, 2010, 6 pages.
(Continued)

*Primary Examiner* — Feben Haile
(74) *Attorney, Agent, or Firm* — Conley Rose, P.C.

(57) ABSTRACT

A user equipment paging method and a mobility management entity (MME) in order to improve user equipment paging efficiency, where the method includes determining, by the MME before paging user equipment in an idle state, a base station last accessed by the user equipment, determining, by the MME, that the base station last accessed by the user equipment is in a non-overload state, and sending, by the MME, a paging message including an identifier of the user equipment to the base station last accessed by the user equipment.

14 Claims, 9 Drawing Sheets

(51) Int. Cl.
*H04W 36/00* (2009.01)
*H04W 92/24* (2009.01)
*H04W 68/06* (2009.01)
*H04W 68/08* (2009.01)

(52) U.S. Cl.
CPC ............ *H04W 68/06* (2013.01); *H04W 68/08* (2013.01); *H04W 92/24* (2013.01)

(56) References Cited

U.S. PATENT DOCUMENTS

| | | |
|---|---|---|
| 2010/0220680 A1 | 9/2010 | Ramankutty et al. |
| 2013/0208660 A1 | 8/2013 | Kanazawa et al. |
| 2013/0316706 A1 | 11/2013 | Knauft |
| 2014/0024378 A1 | 1/2014 | Khude et al. |
| 2014/0094201 A1* | 4/2014 | Knauft .................. H04W 68/12 455/458 |
| 2014/0323145 A1* | 10/2014 | Lam ...................... H04W 68/02 455/456.1 |
| 2015/0031382 A1* | 1/2015 | Damnjanovic ... H04W 52/0216 455/452.1 |
| 2015/0080034 A1 | 3/2015 | Xi et al. |
| 2016/0353408 A1 | 12/2016 | Hayashi |

FOREIGN PATENT DOCUMENTS

| | | |
|---|---|---|
| CN | 101888697 A | 11/2010 |
| CN | 101895986 A | 11/2010 |
| CN | 102333342 A | 1/2012 |
| CN | 102835162 A | 12/2012 |
| CN | 102273291 B | 12/2013 |
| CN | 104105118 A | 10/2014 |
| CN | 104219656 A | 12/2014 |
| RU | 2532698 C1 | 11/2014 |
| WO | 2010133172 A1 | 11/2010 |
| WO | 2014030274 A1 | 2/2014 |
| WO | 2014168859 A2 | 10/2014 |

OTHER PUBLICATIONS

Machine Translation and Abstract of Chinese Publication No. CN101827430, Sep. 8, 2010, 13 pages.
Machine Translation and Abstract of Chinese Publication No. CN101895986, Nov. 24, 2010, 14 pages.
Machine Translation and Abstract of Chinese Publication No. CN104105118, Oct. 15, 2014, 14 pages.
Foreign Communication From a Counterpart Application, PCT Application No. PCT/CN2015/070529, English Translation of International Search Report dated Oct. 8, 2015, 2 pages.
Foreign Communication From a Counterpart Application, PCT Application No. PCT/CN2015/070529, English Translation of Written Opinion dated Oct. 8, 2015, 7 pages.
Machine Translation and Abstract of International Publication No. WO2010133172, Nov. 25, 2010, 22 pages.
Foreign Communication From a Counterpart Application, Russian Application No. 2017128082/08, English Translation of Russian Office Action dated Jul. 16, 2018, 4 pages.
Foreign Communication From a Counterpart Application, Russian Application No. 2017128082/08, English Translation of Russian Search Report dated Jul. 16, 2018, 2 pages.
Foreign Communication From a Counterpart Application, European Application No. 15877405.9, Partial Supplementary European Search Report dated Dec. 4, 2017, 16 pages.
Machine Translation and Abstract of Chinese Publication No. CN101888697, Nov. 17, 2010, 13 pages.
Machine Translation and Abstract of Chinese Publication No. CN102273291, Dec. 18, 2013, 20 pages.
Machine Translation and Abstract of Chinese Publication No. CN102333342, Jan. 25, 2012, 20 pages.
Machine Translation and Abstract of Chinese Publication No. CN104219656, Dec. 17, 2014, 41 pages.
Nokia Networks, et al., "Paging in last known cell," S2-144244, SA WG2 Meeting #106, Nov. 17-21, 2014, 5 pages.
NTT Docomo, "Paging Optimization for the low mobility devices," S2-141046, SA WG2 Meeting #102, Mar. 24-28, 2014, 3 pages.
Wu, X., et al., "A Low-Cost, Low-Delay Location Update/Paging Scheme in Hierarchical Cellular Networks," 2003, 5 pages.
Foreign Communication From a Counterpart Application, European Application No. 19164210.7, Extended European Search Report dated Oct. 9, 2019, 20 pages.

* cited by examiner

USER EQUIPMENT PAGING METHOD AND MME

CROSS-REFERENCE TO RELATED APPLICATION

This application is a continuation of International Patent Application No. PCT/CN2015/070529 filed on Jan. 12, 2015, which is hereby incorporated by reference in its entirety.

TECHNICAL FIELD

Embodiments of the present disclosure relate to the communications field, and in particular, to a user equipment paging method and a mobility management entity (MME).

BACKGROUND

In an evolved packet system, there are two states for user equipment attaching to a network a connected state and an idle state. In the connected state, a network side device allocates radio resources to the user equipment for transmission of user plane data, and a data packet may be directly transmitted between the user equipment and the network device. However, in the connected state, the user equipment consumes power quickly and occupies more radio resources. Therefore, the network side device turns the user equipment to the idle state when there is no data transmission for a period of time. In the idle state, the network device releases the radio resources allocated to the user equipment, and the user equipment operates in a power saving mode. However, when the user equipment in the idle state needs to transmit data, the user equipment first needs to turn to the connected state. In the idle state, a location area that is of the user equipment and known by the network side device is called a tracking area list. The user equipment is paged in all cells in the tracking area list of the user equipment using a paging technology when the network side device needs to send signaling or data to the user equipment. After receiving a paging message sent to the user equipment, the user equipment makes a response, establishes a communications link to the network side device, and turns to the connected state. However, in other approaches, paging needs to be performed in a tracking area list of user equipment, and due to a large paging range of the tracking area list, paging efficiency is low and more paging resources are consumed.

SUMMARY

Embodiments of the present disclosure provide a user equipment paging method and an MME to resolve a problem of low paging efficiency in the other approaches.

To resolve the foregoing technical problem, a first aspect of the embodiments of the present disclosure provides a user equipment paging method, including determining, by an MME before paging user equipment in an idle state, a base station last accessed by the user equipment, determining, by the MME, that the base station last accessed by the user equipment is in a non-overload state, and sending, by the MME, a paging message including an identifier of the user equipment to the base station last accessed by the user equipment.

With reference to the first aspect, in a first possible implementation manner, the method further includes determining, by the MME, that the user equipment is paged successfully when a service request message sent by the base station last accessed by the user equipment is received within a preset time, or determining, by the MME, that the user equipment fails to be paged, and sending a paging message including the identifier of the user equipment to all base stations corresponding to a tracking area list of the user equipment when no service request message sent by the base station last accessed by the user equipment is received within a preset time, where the service request message is used to request establishment of a downlink tunnel for the user equipment.

With reference to the first aspect or the first possible implementation manner, in a second possible implementation manner, determining, by the MME, that the base station last accessed by the user equipment is in a non-overload state includes monitoring, by the MME, a parameter value of a load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring, by the MME, a link parameter value of a link between the MME and the base station last accessed by the user equipment, and determining that the base station last accessed by the user equipment is in the non-overload state if the link parameter value of the link is greater than a link parameter threshold, or determining, by the MME according to a non-overload notification message reported by the base station last accessed by the user equipment, that the base station last accessed by the user equipment is in the non-overload state.

With reference to the first aspect, in a third possible implementation manner, the method further includes determining, by the MME, that the base station last accessed by the user equipment is in an overload state, and performing a traffic control operation on the base station last accessed by the user equipment, or performing a traffic control operation on the base station last accessed by the user equipment when a parameter value of a load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than a maximum value of a processing capability parameter of the base station last accessed by the user equipment.

With reference to the third possible implementation manner of the first aspect, in a fourth possible implementation manner, performing, by the MME, a traffic control operation on the base station last accessed by the user equipment includes discarding, by the MME, all signaling messages or paging messages to be sent to the base station last accessed by the user equipment, or obtaining, by the MME, priorities of signaling messages or paging messages to be sent to the base station last accessed by the user equipment, and discarding a signaling message or paging message whose priority is less than a preset priority, or randomly discarding, by the MME, a preset percentage of signaling messages or paging messages to be sent to the base station last accessed by the user equipment.

A second aspect of the embodiments of the present disclosure provides a user equipment paging method, including determining, by an MME before paging user equipment in an idle state, a base station last accessed by the user equipment, determining, by the MME, that a type of the base station last accessed by the user equipment is a preset base station type, and sending, by the MME, a paging message including an identifier of the user equipment to the base station last accessed by the user equipment.

With reference to the second aspect, in a first possible implementation manner, the method further includes determining, by the MME, that the user equipment is paged successfully when a service request message sent by the base station last accessed by the user equipment is received within a preset time, or determining, by the MME, that the user equipment fails to be paged, and sending a paging message including the identifier of the user equipment to all base stations corresponding to a tracking area list of the user equipment when no service request message sent by the base station last accessed by the user equipment is received within a preset time, where the service request message is used to request establishment of a downlink tunnel for the user equipment.

With reference to the second aspect, in a second possible implementation manner, before determining, by the MME, that a type of the base station last accessed by the user equipment is a preset base station type, the method further includes determining, by the MME, that the base station last accessed by the user equipment is in a non-overload state.

With reference to the second possible implementation manner of the second aspect, in a third possible implementation manner, determining, by the MME, that the base station last accessed by the user equipment is in a non-overload state includes monitoring, by the MME, a parameter value of a load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring, by the MME, a link parameter value of a link between the MME and the base station last accessed by the user equipment, and determining that the base station last accessed by the user equipment is in the non-overload state if the link parameter value of the link is greater than a link parameter threshold, or determining, by the MME according to a non-overload notification message reported by the base station last accessed by the user equipment, that the base station last accessed by the user equipment is in the non-overload state.

With reference to the second or the third possible implementation manner of the second aspect, in a fourth possible implementation manner, the method further includes determining, by the MME, that the base station last accessed by the user equipment is in an overload state, and performing a traffic control operation on the base station last accessed by the user equipment, or performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

With reference to the fourth possible implementation manner of the second aspect, in a fifth possible implementation manner, performing, by the MME, a traffic control operation on the base station last accessed by the user equipment includes discarding, by the MME, all signaling messages or paging messages to be sent to the base station last accessed by the user equipment, or obtaining, by the MME, priorities of signaling messages or paging messages to be sent to the base station last accessed by the user equipment, and discarding a signaling message or paging message whose priority is less than a preset priority, or randomly discarding, by the MME, a preset percentage of signaling messages or paging messages to be sent to the base station last accessed by the user equipment.

A third aspect of the embodiments of the present disclosure provides a user equipment paging method, including determining, by an MME before paging user equipment in an idle state, a tracking area last accessed by the user equipment, determining, by the MME, that a type of the tracking area last accessed by the user equipment is a preset area type, and sending, by the MME, a paging message including an identifier of the user equipment to all base stations corresponding to the tracking area last accessed by the user equipment.

With reference to the third aspect, in a first possible implementation manner, the method further includes determining, by the that the user equipment is paged successfully when a service request message is received within a preset time, or determining, by the MME, that the user equipment fails to be paged, and sending a paging message including the identifier of the user equipment to all base stations corresponding to a tracking area list of the user equipment when no service request message is received within a preset time, where the service request message is used to request establishment of a downlink tunnel for the user equipment.

With reference to the third aspect, in a second possible implementation manner, before determining, by the MME, that a type of the tracking area last accessed by the user equipment is a preset area type, the method further includes determining, by the MME, that a base station last accessed by the user equipment is in a non-overload state.

With reference to the second possible implementation manner of the third aspect, in a third possible implementation manner, determining, by the MME, that the base station last accessed by the user equipment is in a non-overload state includes monitoring, by the MME, a parameter value of a load parameter of the base station last accessed by the user equipment, and determining that the base station last accessed by the user equipment is in the non-overload state, where the load parameter threshold is less than a maximum value of a processing capability parameter of the base station last accessed by the user equipment if the parameter value of the load parameter is not greater than a load parameter threshold, or monitoring, by the MME, a link parameter value of a link between the MME and the base station last accessed by the user equipment, and determining that the base station last accessed by the user equipment is in the non-overload state if the link parameter value of the link is greater than a link parameter threshold, or determining, by the MME according to a non-overload notification message reported by the base station last accessed by the user equipment, that the base station last accessed by the user equipment is in the non-overload state.

With reference to the second or the third possible implementation manner of the third aspect, in a fourth possible implementation manner, the method further includes determining, by the MME, that the base station last accessed by the user equipment is in an overload state, and performing a traffic control operation on the base station last accessed by the user equipment, or performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

With reference to any one of the third aspect to the fourth possible implementation manner, in a fifth possible implementation manner, before the determining, by an MME before paging user equipment in an idle state, a tracking area last accessed by the user equipment, the method further includes allocating, by the MME, the tracking area list to the user equipment, where all tracking areas in the tracking area list are of a same area type.

With reference to the fourth or the fifth possible implementation manner of the third aspect, in a sixth possible implementation manner, performing, by the MME, a traffic control operation on the base station last accessed by the user equipment includes discarding, by the MME, all signaling messages or paging messages to be sent to the base station last accessed by the user equipment, or obtaining, by the MME, priorities of signaling messages or paging messages to be sent to the base station last accessed by the user equipment, and discarding a signaling message or paging message whose priority is less than a preset priority, or randomly discarding, by the MME, a preset percentage of signaling messages or paging messages to be sent to the base station last accessed by the user equipment.

A fourth aspect of the embodiments of the present disclosure provides an MME, including a first determining module configured to determine a base station last accessed by the user equipment before user equipment in an idle state is paged, a second determining module configured to determine that the base station last accessed by the user equipment is in a non-overload state, and a paging instruction module configured to send a paging message including an identifier of the user equipment to the base station last accessed by the user equipment.

With reference to the fourth aspect, in a first possible implementation manner, the MME further includes a first processing module configured to determine that the user equipment is paged successfully when a service request message sent by the base station last accessed by the user equipment is received within a preset time, or a second processing module configured to determine that the user equipment fails to be paged, and send a paging message including the identifier of the user equipment to all base stations corresponding to a tracking area list of the user equipment when no service request message sent by the base station last accessed by the user equipment is received within a preset time, where the service request message is used to request establishment of a downlink tunnel for the user equipment.

With reference to the fourth aspect or the first possible implementation manner, in a second possible implementation manner, the second processing module is configured to monitor a parameter value of a load parameter of the base station last accessed by the user equipment, and determine that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitor a link parameter value of a link between the MME and the base station last accessed by the user equipment, and determine that the base station last accessed by the user equipment is in the non-overload state if the link parameter value of the link is greater than a link parameter threshold, or determine, according to a non-overload notification message reported by the base station last accessed by the user equipment, that the base station last accessed by the user equipment is in the non-overload state.

With reference to the fourth aspect, in a third possible implementation manner, the MME further includes a first traffic control module configured to determine that the base station last accessed by the user equipment is in an overload state, and perform a traffic control operation on the base station last accessed by the user equipment, or a second traffic control module configured to perform a traffic control operation on the base station last accessed by the user equipment when a parameter value of a load parameter of the base station last accessed by the user equipment is greater than a first parameter threshold, and cancel the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than a maximum value of a processing capability parameter of the base station last accessed by the user equipment.

A fifth aspect of the embodiments of the present disclosure provides a MME, including a first determining module configured to determine a base station last accessed by the user equipment before user equipment in an idle state is paged, a second determining module configured to determine that a type of the base station last accessed by the user equipment is a preset base station type, and a paging instruction module configured to send a paging message including an identifier of the user equipment to the base station last accessed by the user equipment.

With reference to the fifth aspect, in a first possible implementation manner, the MME further includes a first processing module configured to determine that the user equipment is paged successfully when a service request message sent by the base station last accessed by the user equipment is received within a preset time, or a second processing module configured to determine that the user equipment fails to be paged, and send a paging message including the identifier of the user equipment to all base stations corresponding to a tracking area list of the user equipment when no service request message sent by the base station last accessed by the user equipment is received within a preset time, where the service request message is used to request establishment of a downlink tunnel for the user equipment.

With reference to the fifth aspect, in a second possible implementation manner, the MME further includes a third determining module configured to determine that the base station last accessed by the user equipment is in a non-overload state and instruct the second determining module to start working.

With reference to the second possible implementation manner of the fifth aspect, in a third possible implementation manner, the third determining module is configured to monitor a parameter value of a load parameter of the base station last accessed by the user equipment, and determine that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitor a link parameter value of a link between the MME and the base station last accessed by the user equipment, and determine that the base station last accessed by the user equipment is in the non-overload state if the link parameter value of the link is greater than a link parameter threshold, or determine, according to a non-overload notification message reported by the base station last accessed by the user equipment, that the base station last accessed by the user equipment is in the non-overload state.

With reference to the second or the third possible implementation manner of the fifth aspect, in a fourth possible implementation manner, the MME further includes a first traffic control module configured to determine that the base station last accessed by the user equipment is in an overload state, and perform a traffic control operation on the base station last accessed by the user equipment, or a second traffic control module configured to perform a traffic control operation on the base station last accessed by the user equipment when the parameter value of the load parameter of the base station last accessed by the user equipment is greater than a first parameter threshold, and cancel the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

A sixth aspect of the embodiments of the present disclosure provides an MME, including a first determining module configured to determine a tracking area last accessed by the user equipment before user equipment in an idle state is paged, a second determining module configured to determine that a type of the tracking area last accessed by the user equipment is a preset area type, and a paging instruction module configured to send a paging message including an identifier of the user equipment to all base stations corresponding to the tracking area last accessed by the user equipment.

With reference to the sixth aspect, in a first possible implementation manner, the MME further includes a first processing module configured to determine that the user equipment is paged successfully when a service request message is received within a preset time, or a second processing module configured to determine that the user equipment fails to be paged, and send a paging message including the identifier of the user equipment to all base stations corresponding to a tracking area list of the user equipment when no service request message is received within a preset time, where the service request message is used to request establishment of a downlink tunnel for the user equipment.

With reference to the sixth aspect, in a second possible implementation manner, the MME further includes a third determining module configured to determine that a base station last accessed by the user equipment is in a non-overload state and instruct the second determining module to start working.

With reference to the second possible implementation manner of the sixth aspect, in a third possible implementation manner, the third determining module is configured to monitor a parameter value of a load parameter of the base station last accessed by the user equipment, and determine that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitor a link parameter value of a link between the MME and the base station last accessed by the user equipment, and determine that the base station last accessed by the user equipment is in the non-overload state if the link parameter value of the link is greater than a link parameter threshold, or determine, according to a non-overload notification message reported by the base station last accessed by the user equipment, that the base station last accessed by the user equipment is in the non-overload state.

With reference to the second or the third possible implementation manner of the sixth aspect, in a fourth possible implementation manner, the MME further includes a first traffic control module configured to determine that the base station last accessed by the user equipment is in an overload state, and perform a traffic control operation on the base station last accessed by the user equipment, or a second traffic control module configured to perform a traffic control operation on the base station last accessed by the user equipment when the parameter value of the load parameter of the base station last accessed by the user equipment is greater than a first parameter threshold, and cancel the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

With reference to any one of the sixth aspect to the fourth possible implementation manner, in a fifth possible implementation manner, the MME further includes an area allocation module configured to allocate the tracking area list to the user equipment, where all tracking areas in the tracking area list are of a same area type.

A seventh aspect of the embodiments of the present disclosure provides an MME, including a processor and a memory, where the memory stores a set of program code, and the processor invokes the program code stored in the memory to perform the operations of determining a base station last accessed by the user equipment before paging user equipment in an idle state, determining that the base station last accessed by the user equipment is in a non-overload state, and sending a paging message including an identifier of the user equipment to the base station last accessed by the user equipment.

With reference to the seventh aspect, in a first possible implementation manner, the processor is further configured to perform determining that the user equipment is paged successfully when a service request message sent by the base station last accessed by the user equipment is received within a preset time, or determining that the user equipment fails to be paged, and sending a paging message including the identifier of the user equipment to all base stations corresponding to a tracking area list of the user equipment when no service request message sent by the base station last accessed by the user equipment is received within a preset time, where the service request message is used to request establishment of a downlink tunnel for the user equipment.

With reference to the seventh aspect or the first possible implementation manner, in a second possible implementation manner, that the processor executes determining that the base station last accessed by the user equipment is in a non-overload state includes monitoring a parameter value of a load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring a link parameter value of a link between the MME and the base station last accessed by the user equipment, and determining that the base station last accessed by the user equipment is in the non-overload state if the link parameter value of the link is greater than a link parameter threshold, or determining, according to a non-overload notification message reported by the base station last accessed by the user equipment, that the base station last accessed by the user equipment is in the non-overload state.

With reference to the seventh aspect, in a third possible implementation manner, the processor is further configured to perform determining that the base station last accessed by the user equipment is in an overload state, and performing a traffic control operation on the base station last accessed by the user equipment, or performing a traffic control operation on the base station last accessed by the user equipment when a parameter value of a load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than a maximum value of a processing capability parameter of the base station last accessed by the user equipment.

An eighth aspect of the embodiments of the present disclosure provides an MME, including a processor and a memory, where the memory stores a set of program code, and the processor invokes the program code stored in the memory to perform the operations of determining a base station last accessed by the user equipment before paging user equipment in an idle state, determining that a type of the base station last accessed by the user equipment is a preset base station type, and sending a paging message including an identifier of the user equipment to the base station last accessed by the user equipment.

With reference to the eighth aspect, in a first possible implementation manner, the processor is further configured to perform determining that the user equipment is paged successfully when a service request message sent by the base station last accessed by the user equipment is received within a preset time, or determining that the user equipment fails to be paged, and sending a paging message including the identifier of the user equipment to all base stations corresponding to a tracking area list of the user equipment when no service request message sent by the base station last accessed by the user equipment is received within a preset time, where the service request message is used to request establishment of a downlink tunnel for the user equipment.

With reference to the eighth aspect, in a second possible implementation manner, before executing determining that a type of the base station last accessed by the user equipment is a preset base station type, the processor is further configured to perform determining that the base station last accessed by the user equipment is in a non-overload state.

With reference to the second possible implementation manner of the eighth aspect, in a third possible implementation manner, that the processor executes determining that the base station last accessed by the user equipment is in a non-overload state includes monitoring a parameter value of a load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring a link parameter value of a link between the MME and the base station last accessed by the user equipment, and determining that the base station last accessed by the user equipment is in the non-overload state if the link parameter value of the link is greater than a link parameter threshold, or determining, according to a non-overload notification message reported by the base station last accessed by the user equipment, that the base station last accessed by the user equipment is in the non-overload state.

With reference to the second or the third possible implementation manner of the eighth aspect, in a fourth possible implementation manner, the processor is further configured to perform determining that the base station last accessed by the user equipment is in an overload state, and performing a traffic control operation on the base station last accessed by the user equipment, or performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

A ninth aspect of the embodiments of the present disclosure provides an MME, including a processor and a memory, where the memory stores a set of program code, and the processor invokes the program code stored in the memory to perform the operations of determining a tracking area last accessed by the user equipment before paging user equipment in an idle state, determining that a type of the tracking area last accessed by the user equipment is a preset area type, and sending a paging message including an identifier of the user equipment to all base stations corresponding to the tracking area last accessed by the user equipment.

With reference to the ninth aspect, in a first possible implementation manner, the processor is further configured to perform determining that the user equipment is paged successfully when a service request message is received within a preset time, or determining that the user equipment fails to be paged, and sending a paging message including the identifier of the user equipment to all base stations corresponding to a tracking area list of the user equipment when no service request message is received within a preset time, where the service request message is used to request establishment of a downlink tunnel for the user equipment.

With reference to the ninth aspect, in a second possible implementation manner, before executing the determining that a type of the tracking area last accessed by the user equipment is a preset area type, the processor is further configured to perform determining that a base station last accessed by the user equipment is in a non-overload state.

With reference to the second possible implementation manner of the ninth aspect, in a third possible implementation manner, that the processor executes determining that a base station last accessed by the user equipment is in a non-overload state includes monitoring a parameter value of a load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring a link parameter value of a link between the MME and the base station last accessed by the user equipment, and determining that the base station last accessed by the user equipment is in the non-overload state if the link parameter value of the link is greater than a link parameter threshold, or determining, according to a non-overload notification message reported by the base station last accessed by the user equipment, that the base station last accessed by the user equipment is in the non-overload state.

With reference to the second or the third possible implementation manner of the ninth aspect, in a fourth possible implementation manner, the processor is further configured to perform determining that the base station last accessed by the user equipment is in an overload state, and performing a traffic control operation on the base station last accessed by the user equipment, or performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

With reference to any one of the ninth aspect to the fourth possible implementation manner, in a fifth possible implementation manner, the processor is further configured to perform allocating the tracking area list to the user equipment, where all tracking areas in the tracking area list are of a same area type.

Implementation of the present disclosure brings about the following beneficial effects.

When an MME needs to page user equipment, the MME determines that a base station last accessed by the user equipment is in a non-overload state, and instructs the base station last accessed by the user equipment to initiate paging in a cell served by the base station. The user equipment can be paged successfully if the user equipment is in the cell served by the last accessed base station. In this way, paging efficiency can be effectively improved, and less paging signaling is consumed.

BRIEF DESCRIPTION OF DRAWINGS

To describe the technical solutions in the embodiments of the present disclosure clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
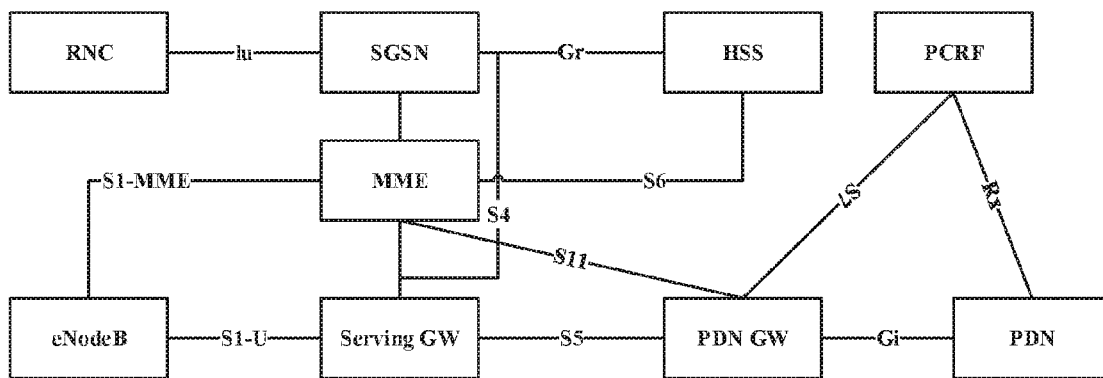
FIG. 1 is a schematic diagram of a network architecture according to Embodiment 1 of the present disclosure.

Referring to FIG. 1, FIG. 1 is a schematic diagram of an evolved packet system (EPS) architecture according to an embodiment of the present disclosure. The EPS architecture may include the following network elements.

Evolved radio access network (E-RAN): can provide higher uplink and downlink rates, lower transmission latency, and more reliable wireless transmission. Network elements included in the E-RAN include an evolved NodeB (eNodeB). The eNodeB provides radio resources for access of user equipment.

Home Subscriber Server (HSS): is used to permanently store subscription data.

Packet data network (PDN): is a gateway (GW) that provides a service for a user.

An evolved packet core (E-Packet Core) network achieves lower latency and allows access of more wireless systems, and includes the following network elements MME: is a control-plane functional entity and is a server that temporarily stores user data. The MME is responsible for managing and storing user equipment contexts (for example, a user identity, a mobility management status, and a user security parameter), and assigning a temporary identity to a user. When user equipment camps in a tracking area of the user equipment or when the user needs to be authenticated, the MME processes non-access stratum messages between the MME and the user equipment, and triggers an eNodeB to perform paging and the like.

Serving GW: is a user-plane entity, and is responsible for routing and processing user-plane data, terminating downlink data of user equipment in an idle state, and managing and storing system architecture evolution (SAE) bearer contexts of the user equipment, for example, an Internet protocol (IP) bearer service parameter and internal routing information of the GW. The serving GW is an internal user-plane anchor of a system. A user can have only one serving GW at one time point.

PDN GW: is a GW responsible for user equipment access to a PDN, assigning an IP address to a user. A user can access multiple PDN GW s at a same time point.

Policy and Charging Rule Function (PCRF): is used to generate, according to service information, subscription information, and operator configuration information, quality of service (QoS) rules and charging rules for controlling user data transmission. The functional entity can also control establishment and release of an access network bearer.

Figure 2:
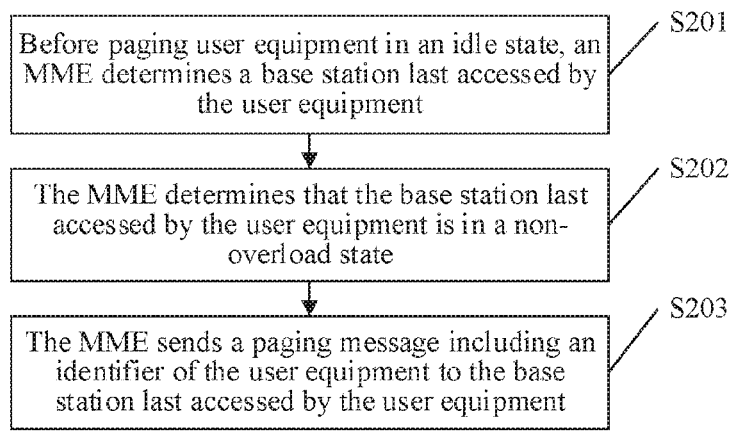
FIG. 2 is a schematic flowchart of a user equipment paging method according to Embodiment 1 of the present disclosure.

Referring to FIG. 2, FIG. 2 is a schematic flowchart of a user equipment paging method according to Embodiment 1 of the present disclosure. In this embodiment of the present disclosure, the method includes the following steps.

Step S201: Before paging user equipment in an idle state, MME determines a base station last accessed by the user equipment.

Further, a Serving GW receives a downlink data packet sent by a data GW, and the downlink data packet carries an identifier of the user equipment. The Serving GW detects a status of a downlink tunnel. If the downlink tunnel is invalid, it indicates that the user equipment is idle, and the Serving GW cannot forward the downlink data packet to the user equipment. The Serving GW buffers the downlink data packet and sends a downlink data notification message to the MME. After receiving the downlink data notification message, the MME returns a downlink data acknowledgement message to the Serving GW. When the MME needs to page the user equipment in the idle state, before paging the user equipment, the MME queries for the base station last accessed by the user equipment. The last accessed base station is a base station most recently accessed by the user equipment when the user equipment is in a connected state. When the user equipment in the connected state is handed over to a base station, a base station identifier of the base station to which the user equipment is handed over is reported to the MME using a signaling message, and the MME stores the base station most recently accessed by the user equipment in the connected state. The MME may query a locally stored base station access record of the user equipment for the base station last accessed by the user equipment.

A tracking area list includes one or more tracking areas, and the tracking area includes one or more base stations. When the user equipment in the idle state is located in a tracking area of the tracking area list, the user equipment does not need to initiate a tracking area update request. The user equipment initiates a tracking area update request to the MME when moving to a tracking area that does not belong to the tracking area list. The tracking area update request carries an identifier of a tracking area in which the user equipment is currently located and an identifier of a last accessed tracking area. The MME updates the tracking area list according to the identifier of the tracking area in which the user equipment is currently located and the identifier of the last accessed tracking area, and returns an updated tracking area list to the user equipment. The MME stores a mapping table between tracking areas and base stations, and may query the mapping table for a base station corresponding to a tracking area.

Step S202: The MME determines that the base station last accessed by the user equipment is in a non-overload state.

A load status of the base station last accessed by the user equipment includes an overload state and the non-overload state. The load status of the base station last accessed by the user equipment may be determined by the MME according to a parameter value of a load parameter of the base station, or be determined by the MME according to a link parameter value of a link between the MME and the base station. Alternatively, the base station determines the load status of the base station last accessed by the user equipment and sends a non-overload notification message to the MME, and the MME determines, using the non-overload notification message, that the base station last accessed by the user equipment is in the non-overload state.

Step S203; The MME sends a paging message including an identifier of the user equipment to the base station last accessed by the user equipment.

There is a high probability that the user equipment is located in a cell served by the last accessed base station. If the base station last accessed by the user equipment is in the non-overload state, the MME sends the paging message carrying the identifier of the user equipment to the base station last accessed by the user equipment. After receiving the paging message, the base station last accessed by the user equipment pages the user equipment in the cell served by the base station. If the user equipment is paged successfully, the user equipment initiates a service request process to the MME, and the user equipment sends a service request message to the MME using the last accessed base station. After receiving the service request message, the MME establishes a downlink tunnel, and the user equipment turns from the idle state to the connected state. The SGW sends the buffered downlink data packet to the user equipment through the established downlink tunnel. In this way, the MME can send less paging signaling, and signaling resources are reduced.

During implementation of this embodiment of the present disclosure, when an MME needs to page user equipment, the MME determines that a base station last accessed by the user equipment is in a non-overload state, and instructs the base station last accessed by the user equipment to initiate paging in a cell served by the base station. If the user equipment is in the cell of the last accessed base station, the user equipment can be paged successfully. In this way, paging efficiency can be effectively improved, and less paging signaling is consumed.

Figure 3:
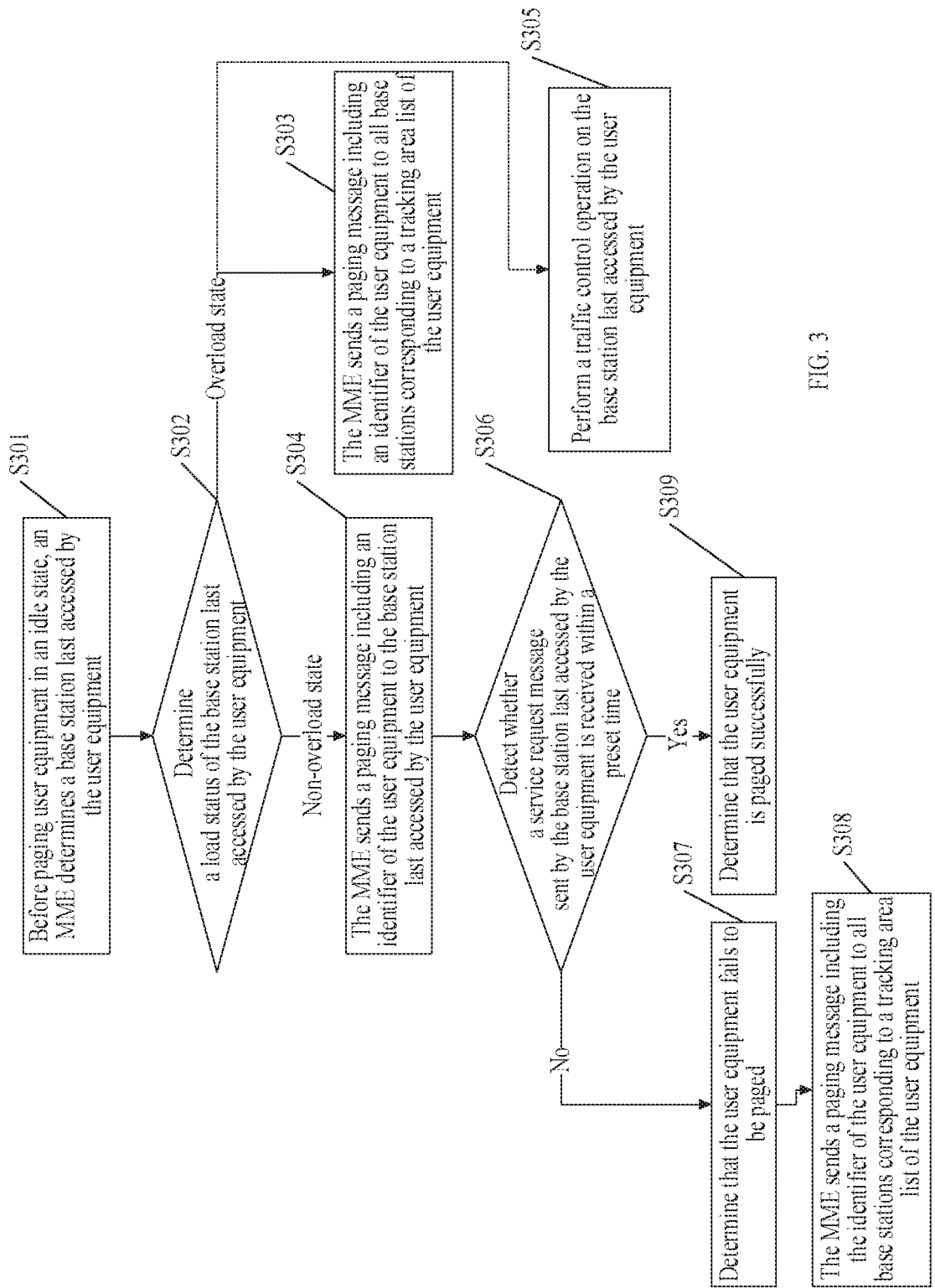
FIG. 3 is a schematic flowchart of a user equipment paging method according to Embodiment 2 of the present disclosure.

Referring to FIG. 3, FIG. 3 is a schematic flowchart of a user equipment paging method according to an embodiment of the present disclosure. In this embodiment of the present disclosure, the method includes the following steps.

Step S301: Before paging user equipment in an idle state, an MME determines a base station last accessed by the user equipment.

Further, for a specific process of step S301, refer to the description of step S201, and details are not described herein again.

Step S302: Determine a load status of the base station last accessed by the user equipment.

The load status of the base station last accessed by the user equipment includes an overload state and a non-overload state. The load status of the base station last accessed by the user equipment may be determined by the MME according to a parameter value of a load parameter of the base station, or be determined by the MME according to a link parameter value of a link between the MME and the base station. Alternatively, the base station determines the load status of the base station last accessed by the user equipment and sends a non-overload notification message or an overload notification message to the MME, and the MME performs determining according to the non-overload notification message or the overload notification message. Perform step S303 or step S305 if the MME determines that the base station last accessed by the user equipment is in the overload state, and perform step S304 if the MME determines that the base station last accessed by the user equipment is in the non-overload state.

Further, that the MME determines that the base station last accessed by the user equipment is in the non-overload state includes monitoring, by the MME, the parameter value of the load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring, by the MME, the link parameter value of the link between the MME and the base station last accessed by the user equipment, and determining that the base station last accessed by the user equipment is in the non-overload state if the link parameter value of the link is greater than a link parameter threshold, or determining, by the MME according to the non-overload notification message reported by the base station last accessed by the user equipment, that the base station last accessed by the user equipment is in the non-overload state.

Further, for a specific process of determining, by the base station, the load status of the base station last accessed by the user equipment, refer to the description in method Embodiment 2, and details are not described herein again.

Step S303: The MME sends a paging message including an identifier of the user equipment to all base stations corresponding to a tracking area list of the user equipment.

A load of the base station last accessed by the user equipment may be further aggravated and a service cannot be provided normally when the base station last accessed by the user equipment is in the overload state, if the MME first instructs the base station last accessed by the user equipment to perform paging, and the user equipment is not in a cell of the base station last accessed by the user equipment. In this case, a paging policy used by the MME is to instruct all the base stations corresponding to the tracking area list of the user equipment to initiate paging. The base stations corresponding to the tracking area list of the user equipment include the base station last accessed by the user equipment. The MME sends the paging message carrying the identifier of the user equipment to all the base stations corresponding to the tracking area list, and the paging message is used to instruct the base stations to page the user equipment in cells served by the base stations. The user equipment in the idle state is located in a cell of a base station corresponding to the tracking area list, and the MME instructs all the base stations corresponding to the tracking area list to initiate paging. Therefore, the user equipment can be paged successfully.

Step S304: The MME sends a paging message including an identifier of the user equipment to the base station last accessed by the user equipment.

For a specific process of step S304, refer to the description of step S203, and details are not described herein again.

Step S305: Perform a traffic control operation on the base station last accessed by the user equipment.

When the MME determines that the base station last accessed by the user equipment is in the overload state, it indicates that performance of the link between the MME and the base station last accessed by the user equipment deteriorates and the load of the base station last accessed by the user equipment is aggravated. The MME needs to perform the traffic control operation on the base station last accessed by the user equipment in order to reduce service processing pressure of the base station last accessed by the user equipment and prevent the base station last accessed by the user equipment from failing to provide a service.

For example, a link parameter is a quantity of users, the link parameter threshold is 1000, and a monitoring period is 10 seconds (s). When a current monitoring time point t arrives, the MME detects that a quantity of users for the base station last accessed by the user equipment at the current monitoring time point t is 1200, which is greater than the link parameter threshold 1000. The MME determines that the base station last accessed by the user equipment is in the overload state, and the MME needs to perform a traffic control operation on the base station last accessed by the user equipment within a time period from the time point t to a time point t+10 s. When the next monitoring time point t+10 s arrives, the MME detects that a quantity of users for the base station last accessed by the user equipment at the time point t+10 s is 800, which is less than the link parameter threshold 1000. The MME determines that the base station last accessed by the user equipment is in the non-overload state, and the MME does not perform traffic control on the base station last accessed by the user equipment from the time point t+10 s to a time point t+20 s. If the MME detects that a quantity of users for the base station last accessed by the user equipment at the time point t+10 s is 1100, which is still greater than the link parameter threshold 1000. The MME determines that the base station last accessed by the user equipment is in the overload state, and the MME continues to perform traffic control on the base station last accessed by the user equipment from the time point t+10 s to the time point t+20 s.

Alternatively, the method further includes performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

The MME periodically monitors the parameter value of the load parameter of the base station last accessed by the user equipment. When the parameter value of the load parameter of the base station last accessed by the user equipment is greater than the first parameter threshold at a current monitoring time point, the MME performs, within a current monitoring period, the traffic control operation on the base station last accessed by the user equipment such that traffic carried by the base station last accessed by the user equipment is reduced and the parameter value of the load parameter corresponding to the base station last accessed by the user equipment becomes smaller. When a next monitoring time point arrives, and the parameter value of the load parameter of the base station last accessed by the user equipment is less than the second parameter threshold, the MME cancels the traffic control operation performed on the base station last accessed by the user equipment. Further, if the parameter value of the load parameter of the base station last accessed by the user equipment is still greater than the first parameter threshold, the MME continues to perform, within a current monitoring period, the traffic control operation on the base station last accessed by the user equipment. The first parameter threshold is greater than the second parameter threshold, and both the first parameter threshold and the second parameter threshold are less than the maximum value of the processing capability parameter of the base station last accessed by the user equipment.

For example, the monitoring period is 10 s, the load parameter of the base station last accessed by the user equipment is a quantity of signaling messages, the first parameter threshold is 720 packets per second (pps), the second parameter threshold is 540 pps, the maximum value of the processing capability parameter of the base station last accessed by the user equipment is 850 pps, and the second parameter threshold<the first parameter threshold<the maximum value of the processing capability parameter of the base station last accessed by the user equipment. At a current monitoring time point t0, the MME detects that a parameter value of the quantity of signaling messages of the base station last accessed by the user equipment is 800 pps, which is greater than the first parameter threshold 720 pps. In a time period from the time point t0 to a time point t0+10 s, the MME performs a traffic control operation on the base station last accessed by the user equipment, aiming to reduce the quantity of signaling messages sent by the MME to the base station last accessed by the user equipment. At the next monitoring time point t0+10 s, the MME detects that the parameter value of the quantity of signaling messages of the base station last accessed by the user equipment is 500 pps, which is less than the second parameter threshold 540 pps. In a time period from t0+10 s to t0+20 s, the MME cancels the traffic control operation performed on the base station last accessed by the user equipment.

Step S306: Detect whether a service request message sent by the base station last accessed by the user equipment is received within a preset time.

The MME instructs the base station last accessed by the user equipment to initiate paging in the cell served by the base station. If the user equipment is not in the cell served by the base station last accessed by the user equipment, the base station last accessed by the user equipment receives no service request message that is initiated by the user equipment for triggering a service request process, and the base station last accessed by the user equipment does not forward the service request message to the MME. If the MME receives, within the preset time after sending the paging message to the base station last accessed by the user equipment, no service request message returned by the user equipment, the MME considers that the base station last accessed by the user equipment fails to page the user equipment, and performs step S307, otherwise, performs step S309. The preset time may be set according to a performance index of a communications system, which is not limited in the present disclosure.

Step S307: Determine that the user equipment fails to be paged.

It is determined that the base station last accessed by the user equipment fails to page the user equipment, and the user equipment is not in the cell of the last accessed base station.

Step S308: The MME sends a paging message including the identifier of the user equipment to all base stations corresponding to a tracking area list of the user equipment.

Step S309: Determine that the user equipment is paged successfully.

Further, in some embodiments of the present disclosure, that the MME performs a traffic control operation on the base station last accessed by the user equipment includes discarding, by the MME, all signaling messages or paging messages to be sent to the base station last accessed by the user equipment, or obtaining, by the MME, priorities of signaling messages or paging messages to be sent to the base station last accessed by the user equipment, and discarding a signaling message or paging message with a lowest priority, or randomly discarding, by the MME, some signaling messages or paging messages to be sent to the base station last accessed by the user equipment.

For a specific process of the traffic control operation in the foregoing step, refer to the description in method Embodiment 2, and details are not described herein again.

Further optionally, in this embodiment of the present disclosure, before the monitoring the parameter value of the load parameter of the base station last accessed by the user equipment, the method further includes obtaining, by the MME, the maximum value of the processing capability parameter of the base station last accessed by the user equipment, and configuring the load parameter threshold, the first parameter threshold, and the second parameter threshold according to the maximum value of the processing capability parameter.

The maximum value of the processing capability parameter of the base station last accessed by the user equipment indicates a maximum quantity of signaling messages or paging messages that can be carried by the base station last accessed by the user equipment. A maximum value of a processing capability parameter of a base station varies with a base station type. For example, a maximum value of a processing capability parameter of a macro base station is greater than a maximum value of a processing capability parameter of a micro base station. When the MME sets the load parameter threshold, the first parameter threshold, and the second parameter threshold, all of the foregoing three thresholds need to be less than the maximum value of the processing capability parameter, and the first parameter threshold needs to be greater than the second parameter threshold. In this way, some resources are reserved for the base station last accessed by the user equipment, preventing the base station last accessed by the user equipment from failing to provide a service.

The processing capability parameter includes a quantity of paging messages or a quantity of signaling messages. The method for obtaining, by the MME, the maximum value of the processing capability parameter of the base station last accessed by the user equipment may include that the base station last accessed by the user equipment reports a maximum value of the quantity of paging messages or the quantity of signaling messages of the base station to the MME. The maximum value of the processing capability parameter of the base station last accessed by the user equipment may be carried in an S1 setup request message, or may be carried in a message exchanged between another base station and the MME.

It should be noted that the maximum value of the processing capability parameter of the base station last accessed by the user equipment may alternatively be configured on the MME or be delivered by an operation and maintenance (O&M) center. For example, based on a first base station identifier, the maximum value of the processing capability parameter of the base station last accessed by the user equipment is configured or delivered. The base station identifier may be an eNodeB ID, a base station IP address, an S1 Application Protocol (S1AP) local entity identifier, or the like.

During implementation of this embodiment of the present disclosure, when an MME needs to page user equipment, the MME determines that a base station last accessed by the user equipment is in a non-overload state, and instructs the base station last accessed by the user equipment to initiate paging in a cell served by the base station. If the user equipment is in the cell of the base station last accessed by the user equipment, the user equipment can be paged successfully. In this way, paging efficiency can be effectively improved, and less paging signaling is consumed.

Figure 4:
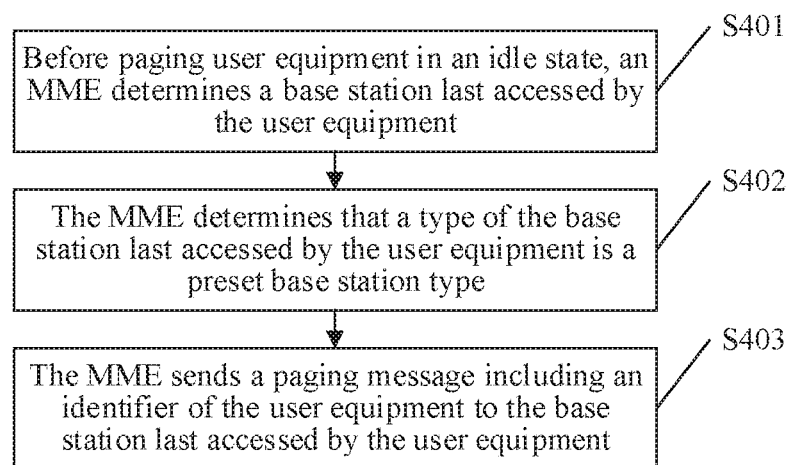
FIG. 4 is a schematic flowchart of a user equipment paging method according to Embodiment 3 of the present disclosure.

Referring to FIG. 4, FIG. 4 is a schematic flowchart of a user equipment paging method according to Embodiment 3 of the present disclosure. In this embodiment of the present disclosure, the method includes the following steps.

Step S401: Before paging user equipment in an idle state, MME determines a base station last accessed by the user equipment.

For a specific process of step S401, refer to the description of step S201, and details are not described herein again.

Step S402: The MME determines that a type of the base station last accessed by the user equipment is a preset base station type.

Further, according to a processing capability and a coverage area of a base station, a base station type includes one or more of a macro base station, a micro base station, a pico base station, or a home base station. The preset base station type is a base station type with a largest coverage area in base station types corresponding to a tracking area list of the user equipment. For example, base stations corresponding to the tracking area list of the user equipment include a macro base station, a micro base station, and a pico base station.

The macro base station has the largest coverage area, and the preset base station is the macro base station.

When the base station last accessed by the user equipment establishes a link to the MME using an S1 interface, the base station last accessed by the user equipment needs to send an S1 setup request message to the MME. The S1 setup request message carries a base station type identifier of a base station type of the base station last accessed by the user equipment. The MME obtains, using the S1 setup request message, the base station type of the base station last accessed by the user equipment. Alternatively, an O&M center maintains a storage record in which base station types of base stations are recorded, and the O&M center notifies the MME of a base station type of the base station last accessed by the user equipment. Alternatively, the MME locally configures a base station type of the base station last accessed by the user equipment, for example, configures, based on a base station identifier, the base station type of the base station last accessed by the user equipment. The base station identifier may be an eNodeB ID, a base station IP address, an S1AP local entity identifier, or the like.

Step S403: The MME sends a paging message including an identifier of the user equipment to the base station last accessed by the user equipment.

Further, a processing capability of the base station last accessed by the user equipment is relatively strong, and there is a high probability that the user equipment is located in a cell served by the base station last accessed by the user equipment. If the base station type of the base station last accessed by the user equipment is the preset base station type, the MME sends the paging message carrying the identifier of the user equipment to the base station last accessed by the user equipment. After receiving the paging message, the base station last accessed by the user equipment pages the user equipment in the cell served by the base station. If the user equipment is paged successfully, the user equipment triggers a service request process to the MME, the MME establishes a downlink tunnel, and the user equipment turns from the idle state to a connected state. The MME sends a buffered downlink data packet to the user equipment through the established downlink tunnel. In this way, the MME can send less paging signaling, and signaling resources are reduced.

During implementation of this embodiment of the present disclosure, when an MME needs to page user equipment, the MME determines a base station type of a base station last accessed by the user equipment. If the base station type is a preset base station type, the MME instructs the last accessed base station to initiate paging in a cell served by the base station. If the user equipment is in a coverage area of the last accessed base station, the user equipment can be paged successfully. In this way, paging efficiency can be effectively improved, and less paging signaling is consumed.

Figure 5:
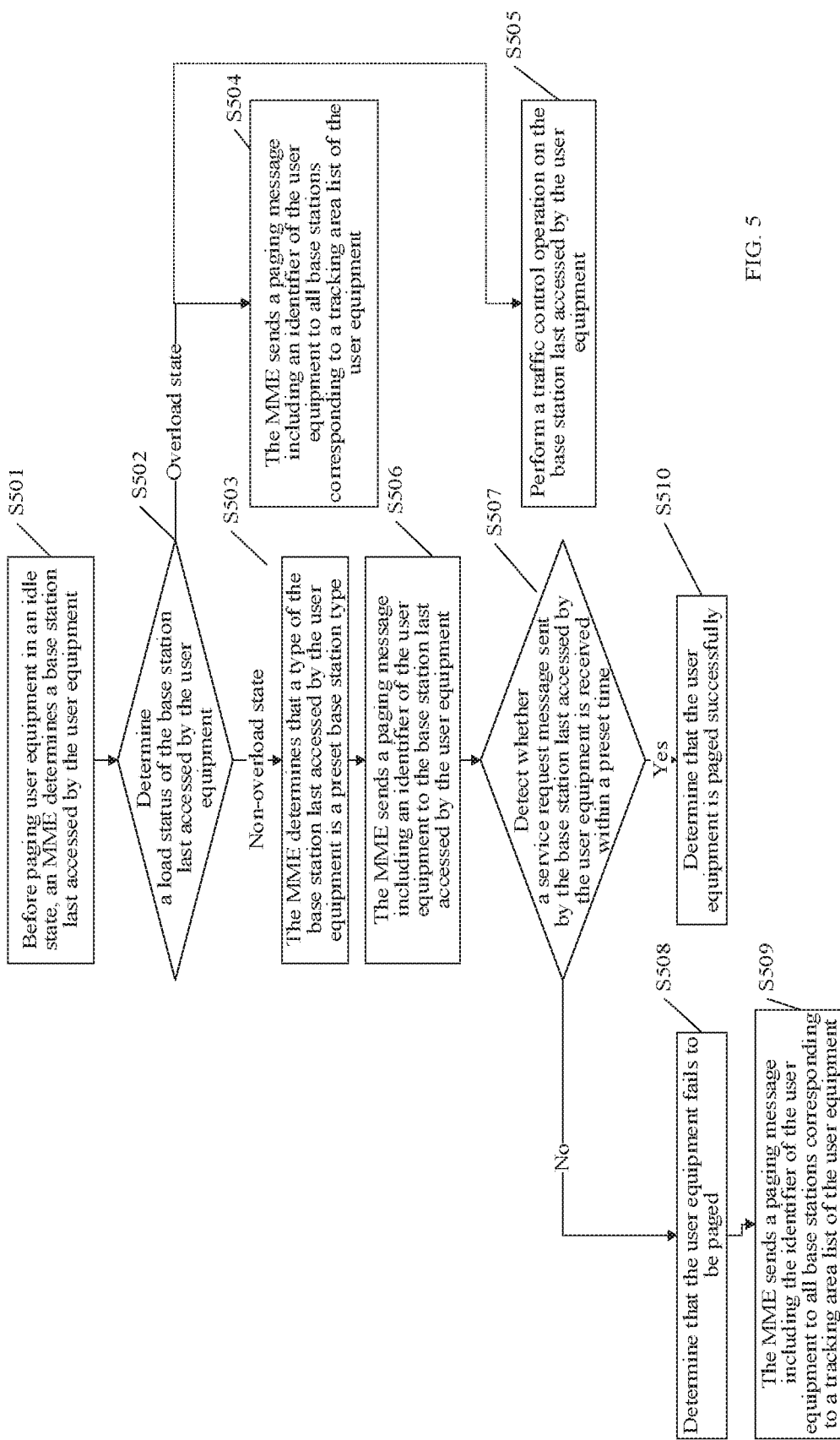
FIG. 5 is a schematic flowchart of a user equipment paging method according to Embodiment 4 of the present disclosure.

Referring to FIG. 5, FIG. 5 is a schematic flowchart of a user equipment paging method according to Embodiment 4 of the present disclosure. In this embodiment of the present disclosure, the method includes the following steps.

Step S501: Before paging user equipment in an idle state, a MME determines a base station last accessed by the user equipment.

Further, for a specific process of step S501, refer to the description of step S201, and details are not described herein again.

Step S502: Determine a load status of the base station last accessed by the user equipment.

Further, a load status of the base station last accessed by the user equipment includes an overload state and a non-overload state. The load status of the base station last accessed by the user equipment may be determined by the MME according to a parameter value of a load parameter of the base station, or be determined by the MME according to a link parameter value of a link between the MME and the base station. Alternatively, the base station determines the load status of the base station last accessed by the user equipment and sends a non-overload notification message or an overload notification message to the MME, and the MME performs determining according to the non-overload notification message or the overload notification message. Perform step S504 or step S505 if the MME determines that the base station last accessed by the user equipment is in the overload state, and perform step S503 if the MME determines that the base station last accessed by the user equipment is in the non-overload state.

Further, that the MME determines that the base station last accessed by the user equipment is in the non-overload state includes monitoring, by the MME, the parameter value of the load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring, by the MME, the link parameter value of the link between the MME and the base station last accessed by the user equipment, and determining that the base station last accessed by the user equipment is in the non-overload state if the link parameter value of the link is greater than a link parameter threshold, or determining, by the MME according to the non-overload notification message reported by the base station last accessed by the user equipment, that the base station last accessed by the user equipment is in the non-overload state.

For a specific process of determining, by the base station, the load status of the base station last accessed by the user equipment, refer to the description in method Embodiment 2, and details are not described herein again.

Step S503: The MME determines that a type of the base station last accessed by the user equipment is a preset base station type.

For a specific process of step S503, refer to the description of step S402, and details are not described herein again.

Step S504: The MME sends a paging message including an identifier of the user equipment to all base stations corresponding to a tracking area list of the user equipment.

Further, when the base station last accessed by the user equipment is in the overload state, if the MME first instructs the base station last accessed by the user equipment to perform paging, and the user equipment is not in a cell of the base station last accessed by the user equipment, a load of the base station last accessed by the user equipment may be further aggravated and a service cannot be provided normally. In this case, a paging policy used by the MME is to instruct all the base stations corresponding to the tracking area list of the user equipment to initiate paging. The base stations corresponding to the tracking area list of the user equipment include the base station last accessed by the user equipment. The MME sends the paging message carrying the identifier of the user equipment to all the base stations corresponding to the tracking area list, and the paging message is used to instruct the base stations to page the user equipment in cells served by the base stations. The user equipment in the idle state is located in a cell of a base station corresponding to the tracking area list, and the MME instructs all the base stations corresponding to the tracking area list to initiate paging. Therefore, the user equipment can be paged successfully.

Step S505: Perform a traffic control operation on the base station last accessed by the user equipment.

When the MME determines that the base station last accessed by the user equipment is in the overload state, it indicates that performance of the link between the MME and the base station last accessed by the user equipment deteriorates and the load of the base station last accessed by the user equipment is aggravated. The MME needs to perform the traffic control operation on the base station last accessed by the user equipment in order to reduce service processing pressure of the base station last accessed by the user equipment and prevent the base station last accessed by the user equipment from failing to provide a service.

For example, a link parameter is a quantity of users, the link parameter threshold is 1000, and a monitoring period is 10 s. When a current monitoring time point t arrives, the MME detects that a quantity of users for the base station last accessed by the user equipment at the current monitoring time point t is 1200, which is greater than the link parameter threshold 1000. The MME determines that the base station last accessed by the user equipment is in the overload state, and the MME needs to perform a traffic control operation on the base station last accessed by the user equipment within a time period from the time point t to a time point t+10 s. When the next monitoring time point t+10 s arrives, the MME detects that a quantity of users for the base station last accessed by the user equipment at the time point t+10 s is 800, which is less than the link parameter threshold 1000. The MME determines that the base station last accessed by the user equipment is in the non-overload state, and the MME does not perform traffic control on the base station last accessed by the user equipment from the time point t+10 s to a time point t+2.0 s. If the MME detects that a quantity of users for the base station last accessed by the user equipment at the time point t+10 s is 1100, which is still greater than the link parameter threshold 1000. The MME determines that the base station last accessed by the user equipment is in the overload state, and the MME continues to perform traffic control on the base station last accessed by the user equipment from the time point t+10 s to the time point t+20 s.

Alternatively, the method further includes performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

Further, for a specific process of the foregoing step, refer to the description in method Embodiment 2, and details are not described herein again.

Step S506: The MME sends a paging message including an identifier of the user equipment to the base station last accessed by the user equipment.

A processing capability of the base station last accessed by the user equipment is relatively strong, and there is a high probability that the user equipment is located in a cell served by the base station last accessed by the user equipment. If the base station type of the base station last accessed by the user equipment is the preset base station type, the MME sends the paging message carrying the identifier of the user equipment to the base station last accessed by the user equipment. After receiving the paging message, the base station last accessed by the user equipment pages the user equipment in the cell served by the base station. If the user equipment is paged successfully, the user equipment triggers a service request process to the MME, the MME establishes a downlink tunnel, and the user equipment turns from the idle state to a connected state. The MME sends a buffered downlink data packet to the user equipment through the established downlink tunnel. In this way, the MME can send less paging signaling, and signaling resources are reduced.

Step S507: Detect whether a service request message sent by the base station last accessed by the user equipment is received within a preset time.

The MME instructs the base station last accessed by the user equipment to initiate paging in the cell served by the base station. If the user equipment is not in the cell served by the base station last accessed by the user equipment, the base station last accessed by the user equipment receives no service request message that is initiated by the user equipment for triggering a service request process, and the base station last accessed by the user equipment does not forward the service request message to the MME. If the MME receives, within the preset time after sending the paging message to the base station last accessed by the user equipment, no service request message returned by the user equipment, the MME considers that the base station last accessed by the user equipment fails to page the user equipment, and performs step S508. Otherwise, performs step S510. The preset time may be set according to a performance index of a communications system.

Step S508: Determine that the user equipment fails to be paged.

Further, it is determined that the base station last accessed by the user equipment fails to page the user equipment, and the user equipment is not in the cell of the last accessed base station.

Step S509: The MME sends a paging message including the identifier of the user equipment to all base stations corresponding to a tracking area list of the user equipment.

Step S510: Determine that the user equipment is paged successfully.

Further, in some embodiments of the present disclosure, that the MME performs a traffic control operation on the base station last accessed by the user equipment includes discarding, by the MME, all signaling messages or paging messages to be sent to the base station last accessed by the user equipment, or obtaining, by the MME, priorities of signaling messages or paging messages to be sent to the base station last accessed by the user equipment, and discarding a signaling message or paging message with a lowest priority, or randomly discarding, by the MME, some signaling messages or paging messages to be sent to the base station last accessed by the user equipment.

Further, for a traffic control method in this embodiment of the present disclosure, refer to the description in method Embodiment 2, and details are not described herein again.

Further optionally, in this embodiment of the present disclosure, before monitoring the parameter value of the load parameter of the base station last accessed by the user equipment, the method further includes obtaining, by the MME, the maximum value of the processing capability parameter of the base station last accessed by the user equipment, and configuring the load parameter threshold, the first parameter threshold, and the second parameter threshold according to the maximum value of the processing capability parameter.

Further, for a specific process of setting the load parameter threshold, the first parameter threshold, and the second parameter threshold in this embodiment of the present disclosure, refer to the description in method Embodiment 2, and details are not described herein again.

It should be noted that the base station type of the base station last accessed by the user equipment in this embodiment of the present disclosure is not limited to a macro base station and a pico base station, and may be a micro base station or a home base station. A paging principle satisfies that the MME first performs paging in a coverage area of the base station last accessed by the user equipment when the base station last accessed by the user equipment is a base station having a largest processing capability in the tracking area list, otherwise, the MME first performs paging in the tracking area list.

For example, the base stations corresponding to the tracking area list of the user include a macro base station, a pico base station, and a micro base station. It can be learned that the macro base station has the largest processing capability. If the base station last accessed by the user equipment is a macro base station, the MME first instructs the base station last accessed by the user equipment to initiate paging. If the base station last accessed by the user equipment is not a macro base station, the MME first initiates paging in the base stations corresponding to the tracking area list.

Figure 6:
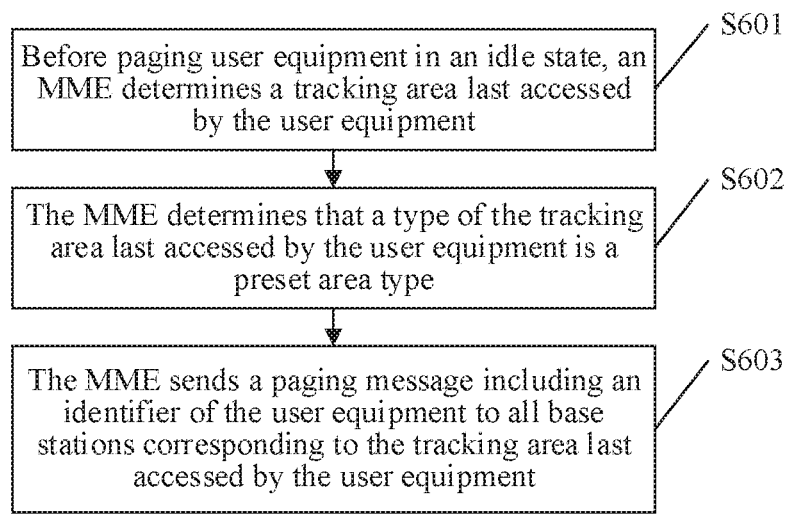
FIG. 6 is a schematic flowchart of a user equipment paging method according to Embodiment 5 of the present disclosure.

Referring to FIG. 6, FIG. 6 is a schematic flowchart of a user equipment paging method according to Embodiment 5 of the present disclosure. In this embodiment of the present disclosure, the method includes the following steps.

Step S601: Before paging user equipment in an idle state, an MME determines a tracking area last accessed by the user equipment.

Further, a tracking area list of the user equipment includes the tracking area last accessed by the user equipment, and the tracking area last accessed by the user equipment is a tracking area most recently accessed by the user equipment when the user equipment is in a connected state. The MME stores a mapping table between tracking areas and base stations, and may query the mapping table for a base station corresponding to a tracking area.

Step S602: The MME determines that a type of the tracking area last accessed by the user equipment is a preset area type.

Further, the preset area type is an area type of a tracking area with a largest coverage area in the tracking area list. The area type depends on a base station type. If all base stations corresponding to the tracking area are macro base stations, all cells included in the tracking area are macro cells, and the area type of the tracking area is a macro tracking area. If all base stations corresponding to the tracking area are pico base stations, all cells included in the tracking area are pico cells. The tracking area list of the user equipment includes one or more types of tracking areas, for example, the tracking area list of the user equipment includes a macro tracking area and a pico tracking area.

Step S603: The MME sends a paging message including an identifier of the user equipment to all base stations corresponding to the tracking area last accessed by the user equipment.

The base stations in the tracking area corresponding to the preset area type have a strong processing capability and have a large coverage area, and there is a high probability that the user equipment is located in the last accessed tracking area. If the area type of the last accessed tracking area is the preset area type, the MME sends the paging message carrying the identifier of the user equipment to all the base stations corresponding to the tracking area last accessed by the user equipment. After receiving the paging message, each base station pages the user equipment in a cell served by the base station. If the user equipment is paged successfully, the user equipment triggers a service request process to the MME, the MME establishes a downlink tunnel, and the user equipment turns from the idle state to the connected state. The MME sends a buffered downlink data packet to the user equipment through the established downlink tunnel. In this way, the MME can send less paging signaling, and signaling resources are reduced.

It should be noted that the user equipment turns from the idle state to the connected state. A base station currently accessed by the user equipment returns, to the MME through the established downlink tunnel, a tracking area identifier of a tracking area currently accessed by the user equipment and a base station identifier of the base station currently accessed by the user equipment. The MME stores the identifiers and updates a tracking area identifier of the tracking area last accessed by the user equipment and a base station identifier of a base station last accessed by the user equipment.

During implementation of this embodiment of the present disclosure, when an MME needs to page user equipment, the MME determines an area type of a tracking area last accessed by the user equipment, and if the area type of the last accessed tracking area is a preset area type, instructs all base stations in the last accessed tracking area to initiate paging in cells served by the base stations. If the user equipment is located in a cell in the last accessed tracking area, the user equipment can be paged successfully. In this way, paging efficiency can be effectively improved, and less paging signaling is consumed.

Figure 7:
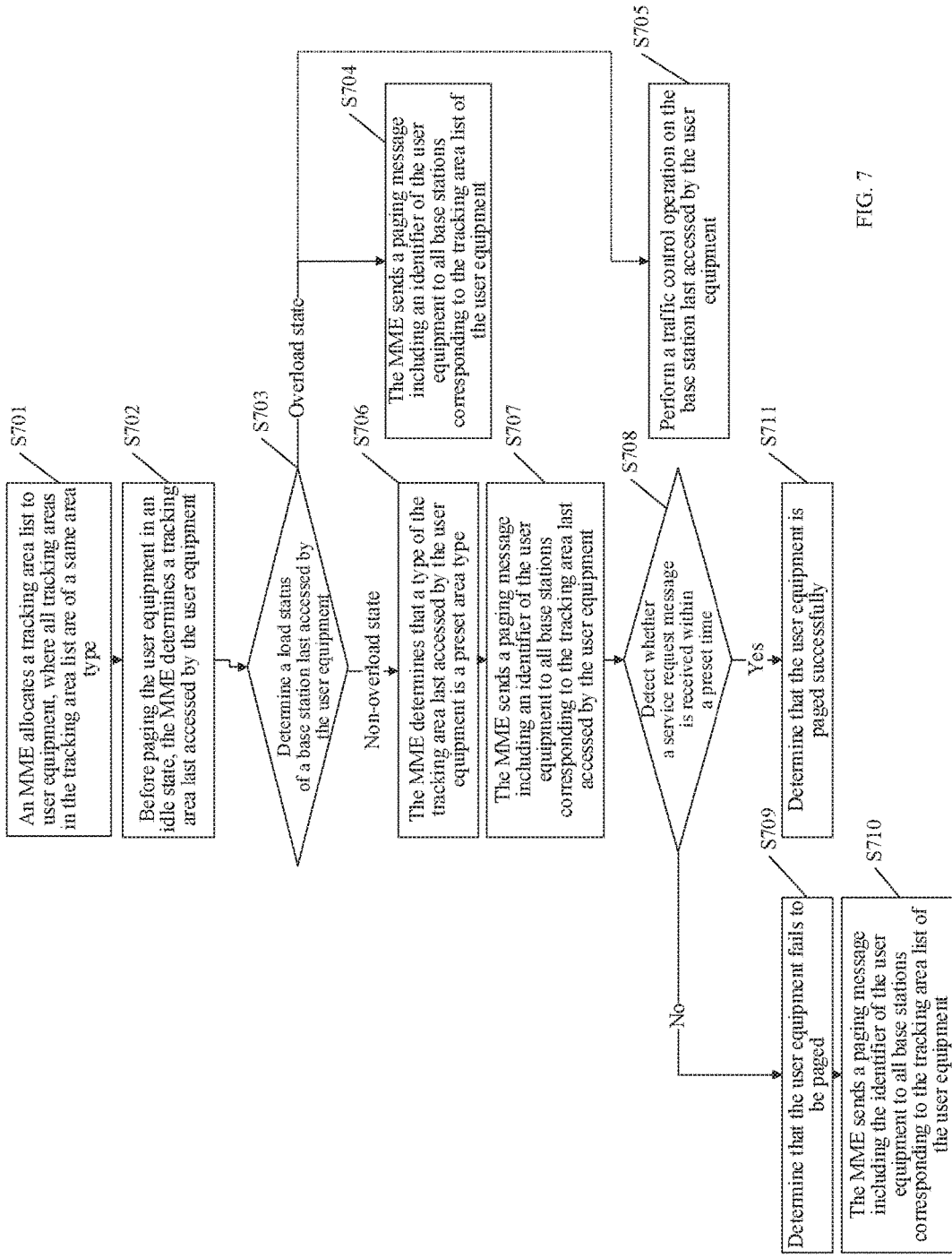
FIG. 7 is a schematic flowchart of a user equipment paging method according to Embodiment 6 of the present disclosure.

Referring to FIG. 7, FIG. 7 is a schematic flowchart of user equipment paging according to Embodiment 6 of the present disclosure. In this embodiment of the present disclosure, the method includes the following steps.

Step S701: An MME allocates the tracking area list to the user equipment, where all tracking areas in the tracking area list are of a same area type.

Further, when the MME is allocating the tracking area list to the user equipment, the tracking area list is allocated according to a type of a base station accessed by the user equipment. All the tracking areas in the tracking area list are of the same area type. For example, when the user equipment accesses a pico base station or a pico cell, the tracking area list allocated to the user equipment by the MME includes only pico tracking areas. When the user equipment accesses a macro cell or a macro base station, the tracking area list allocated to the user equipment by the MME includes only macro tracking areas.

Step S702: Before paging the user equipment in an idle state, the MME determines a tracking area last accessed by the user equipment.

Further, the tracking area list of the user equipment includes the tracking area last accessed by the user equipment, and the tracking area last accessed by the user equipment is a tracking area most recently accessed by the user equipment when the user equipment is in a connected state. The MME stores a mapping table between tracking areas and base stations, and may query the mapping table for a base station corresponding to a tracking area.

Step S703: Determine a load status of a base station last accessed by the user equipment.

Further, a load status of the base station last accessed by the user equipment includes an overload state and a non-overload state. The load status of the base station last accessed by the user equipment may be determined by the MME according to a parameter value of a load parameter of the base station, or be determined by the MME according to a link parameter value of a link between the MME and the base station. Alternatively, the base station determines the load status of the base station last accessed by the user equipment and sends a non-overload notification message or an overload notification message to the MME, and the MME, performs determining according to the non-overload notification message or the overload notification message. Perform step S704 or step S705 if the MME determines that the base station last accessed by the user equipment is in the overload state, and perform step S706 if the MME determines that the base station last accessed by the user equipment is in the non-overload state.

Further, that the MME determines that the base station last accessed by the user equipment is in the non-overload state includes monitoring, by the MME, the parameter value of the load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring, by the MME, the link parameter value of the link between the MME and the base station last accessed by the user equipment, and determining that the base station last accessed by the user equipment is in the non-overload state if the link parameter value of the link is greater than a link parameter threshold, or determining, by the MME according to the non-overload notification message reported by the base station last accessed by the user equipment, that the base station last accessed by the user equipment is in the non-overload state.

Further, for a specific process of determining, by the base station, the load status of the base station last accessed by the user equipment, refer to the description in method Embodiment 2, and details are not described herein again.

Step S704: The MME sends a paging message including an identifier of the user equipment to all base stations corresponding to the tracking area list of the user equipment.

When the base station last accessed by the user equipment is in the overload state, if the MME first instructs the base station last accessed by the user equipment to perform paging, and the user equipment is not in a cell of the base station last accessed by the user equipment, a load of the base station last accessed by the user equipment may be further aggravated and a service cannot be provided normally. In this case, a paging policy used by the MME is to instruct all the base stations corresponding to the tracking area list of the user equipment to initiate paging. The base stations corresponding to the tracking area list of the user equipment include the base station last accessed by the user equipment. The MME sends the paging message carrying the identifier of the user equipment to all the base stations corresponding to the tracking area list, and the paging message is used to instruct the base stations to page the user equipment in cells served by the base stations. The user equipment in the idle state is located in a cell of a base station corresponding to the tracking area list, and the MME instructs all the base stations corresponding to the tracking area list to initiate paging. Therefore, the user equipment can be paged successfully.

Step S705: Perform a traffic control operation on the base station last accessed by the user equipment.

Further, for a specific process of the traffic control operation in S705, refer to the description of S305 in method Embodiment 2, and details are not described herein again.

Alternatively, the method further includes performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

Further, for a specific process of the foregoing step, refer to the description in method Embodiment 2, and details are not described herein again.

Step S706: The MME determines that a type of the tracking area last accessed by the user equipment is a preset area type.

For a specific process of step S706, refer to the description of step S602, and details are not described herein again.

Step S707: The MME sends a paging message including an identifier of the user equipment to all base stations corresponding to the tracking area last accessed b the user equipment.

The preset area type is an area type of a tracking area with a largest coverage area in the tracking area list. The area type depends on a base station type. If all the base stations corresponding to the tracking area are macro base stations, all cells included in the tracking area are macro cells, and the area type of the tracking area is a macro tracking area. If all the base stations corresponding to the tracking area are pico base stations, all cells included in the tracking area are pico cells. The tracking area list of the user equipment includes one or more types of tracking areas, for example, the tracking area list of the user equipment includes a macro tracking area and a pico tracking area.

Step S708: Detect whether a service request message is received within a preset time.

Further, the MME instructs all the base stations corresponding to the tracking area last accessed by the user equipment to initiate paging, and if the user equipment is not in the tracking area last accessed by the user equipment, the MME receives no service request message that is initiated by the user equipment for triggering a service request process. If the MME receives, within the preset time after sending the paging message, no service request message returned by the user equipment, the MME considers that the user equipment fails to be paged in the tracking area last accessed by the user equipment, and performs step S709, otherwise performs step S711. The preset time may be set according to a performance index of a communications system.

Step S709: Determine that the user equipment fails to be paged.

Step S710: The MME sends a paging message including the identifier of the user equipment to all base stations corresponding to the tracking area list of the user equipment.

Step S711: Determine that the user equipment is paged successfully.

Further, in some embodiments of the present disclosure, that the MME performs a traffic control operation on the base station last accessed by the user equipment includes discarding, by the MME, all signaling messages or paging messages to be sent to the base station last accessed by the user equipment, or obtaining, by the MME, priorities of signaling messages or paging messages to be sent to the base station last accessed by the user equipment, and discarding a signaling message or paging message with a lowest priority, or randomly discarding, by the MME, some signaling messages or paging messages to be sent to the base station last accessed by the user equipment.

Further, for a specific process of the foregoing step, refer to the description in method Embodiment 2, and details are not described herein again.

Further optionally, in this embodiment of the present disclosure, before the monitoring the parameter value of the load parameter of the base station last accessed by the user equipment, the method further includes obtaining, by the MME, the maximum value of the processing capability parameter of the base station last accessed by the user equipment, and configuring the load parameter threshold, the first parameter threshold, and the second parameter threshold according to the maximum value of the processing capability parameter.

Further, for configuration of the load parameter threshold, the first parameter threshold, and the second parameter threshold in the foregoing step, refer to the description in method Embodiment 2, and details are not described herein again.

It should be noted that the area type of the tracking area in this embodiment of the present disclosure is not limited to a macro tracking area and a pico tracking area, and may be a micro tracking area or a home base station tracking area. A paging principle satisfies that the MME first initiates paging in the last accessed tracking area when the tracking area last accessed by the user equipment has a largest coverage area. Otherwise, paging is performed in the tracking area list of the user equipment.

For example, the tracking area list of the user equipment includes the following area types a micro tracking area, a pico tracking area, and a home base station tracking area. It can be learned that the micro tracking area has a largest coverage area. If the tracking area last accessed by the user equipment is a micro tracking area, the MME first instructs base stations in the micro tracking area to initiate paging, if the tracking area last accessed by the user equipment is not a micro tracking area, the MME first instructs the base stations corresponding to the tracking area list to initiate paging.

Figure 8:
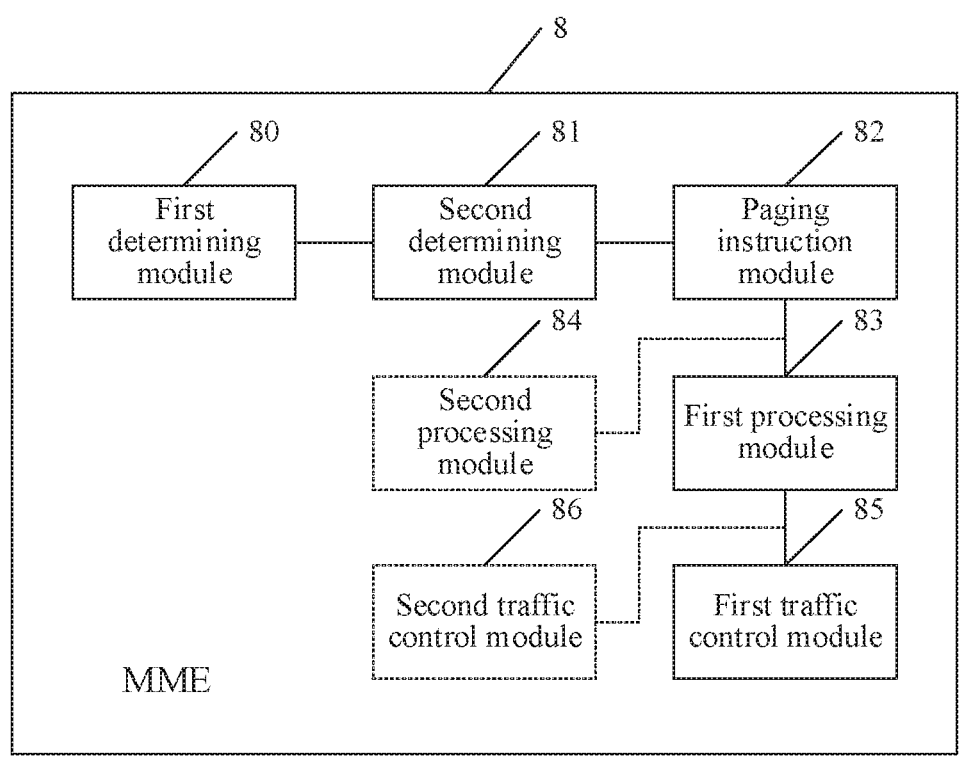
FIG. 8 is a schematic structural diagram of an MME according to Embodiment 1 of the present disclosure.

Referring to FIG. 8, FIG. 8 is a schematic structural diagram of an MME 8 according to Embodiment 1 of the present disclosure. In this embodiment of the present disclosure, the MME 8 includes a first determining module 80, a second determining module 81, and a paging instruction module 82.

The first determining module 80 is configured to determine a base station last accessed by the user equipment before user equipment in an idle state is paged.

The second determining module 81 is configured to determine that the base station last accessed by the user equipment is in a non-overload state.

The paging instruction module 82 is configured to send a paging message including an identifier of the user equipment to the base station last accessed by the user equipment.

The MME 8 according to this embodiment of the present disclosure is used to execute the user equipment paging method described in method Embodiment 1. This embodiment of the present disclosure is based on a same concept as method Embodiment 1, and also brings same technical effects. For a specific process, refer to the description in method Embodiment 1, and details are not described herein again.

Further, optionally, in this embodiment of the present disclosure, in addition to the first determining module 80, the second determining module 81, and the paging instruction module 82, the MME 8 further includes a first processing module 83 or a second processing module 84.

The first processing module 83 is configured to determine that the user equipment is paged successfully when a service request message sent by the base station last accessed by the user equipment is received within a preset time, or the second processing module 84 is configured to determine that the user equipment fails to be paged, and send a paging message including the identifier of the user equipment to all base stations corresponding to a tracking area list of the user equipment when no service request message sent by the base station last accessed by the user equipment is received within a preset time.

The service request message is used to request establishment of a downlink tunnel for the user equipment.

Further, the second processing module 84 is configured to monitor a parameter value of a load parameter of the base station last accessed by the user equipment, and determine that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitor a link parameter value of a link between the MME and the base station last accessed by the user equipment, and determine that the base station last accessed by the user equipment is in the non-overload state if the link parameter value of the link is greater than a link parameter threshold, or determine, according to a non-overload notification message reported by the base station last accessed by the user equipment, that the base station last accessed by the user equipment is in the non-overload state.

Further, optionally, the MME 8 further includes a first traffic control module 85 or a second traffic control module 86.

The first traffic control module 85 is configured to determine that the base station last accessed by the user equipment is in an overload state, and perform a traffic control operation on the base station last accessed by the user equipment, or the second traffic control module 86 is configured to perform a traffic control operation on the base station last accessed by the user equipment when the parameter value of the load parameter of the base station last accessed by the user equipment is greater than a first parameter threshold, and cancel the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

The MME 8 according to this embodiment of the present disclosure is used to perform the user equipment paging method described in method Embodiment 2. This embodiment of the present disclosure is based on a same concept as method Embodiment 2, and also brings same technical effects. For a specific process, refer to the description in method Embodiment 2, and details are not described herein again.

Figure 9:
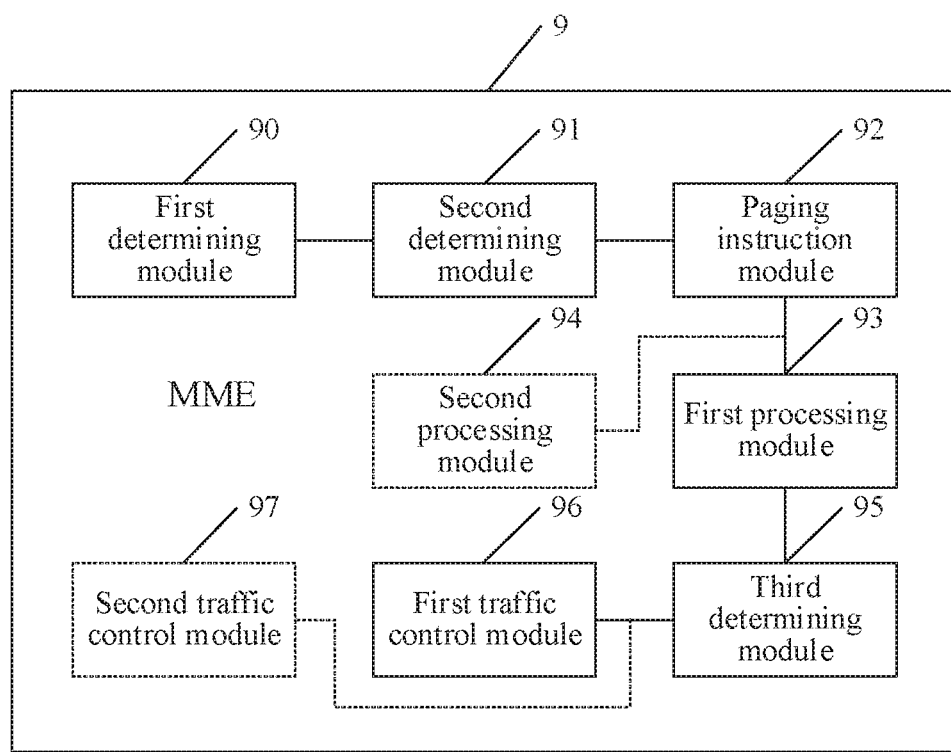
FIG. 9 is a schematic structural diagram of an MME according to Embodiment 2 of the present disclosure.

Referring to FIG. 9, FIG. 9 is a schematic structural diagram of an MME 9 according to Embodiment 2 of the present disclosure. In this embodiment of the present disclosure, the MME 9 includes a first determining module 90, a second determining module 91, and a paging instruction module 92.

The first determining module 90 is configured to determine a base station last accessed by the user equipment before user equipment in an idle state is paged.

The second determining module 91 is configured to determine that a type of the base station last accessed by the user equipment is a preset base station type.

The paging instruction module 92 is configured to send a paging message including an identifier of the user equipment to the base station last accessed by user equipment.

The MME 9 according to this embodiment of the present disclosure is used to perform the user equipment paging method described in method Embodiment 3. This embodiment of the present disclosure is based on a same concept as method Embodiment 3, and also brings same technical effects. For a specific process, refer to the description in method Embodiment 3, and details are not described herein again.

Further, optionally, in this embodiment of the present disclosure, in addition to the first determining module 90, the second determining module 91, and the paging instruction module 92, the MME 9 further includes a first processing module 93 configured to determine that the user equipment is paged successfully when a service request message sent by the base station last accessed by the user equipment is received within a preset time, or a second processing module 94 configured to determine that the user equipment fails to be paged, and send a paging message including the identifier of the user equipment to all base stations corresponding to a tracking area list of the user equipment when no service request message sent by the base station last accessed by the user equipment is received within a preset time, where the service request message is used to request establishment of a downlink tunnel for the user equipment.

Optionally, the MME further includes a third determining module 95 configured to determine that the base station last accessed by the user equipment is in a non-overload state and instruct the second determining module 91 to start working.

Further, optionally, the third determining module 95 is configured to monitor a parameter value of a load parameter of the base station last accessed by the user equipment, and determine that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitor a link parameter value of a link between the MME 9 and the base station last accessed by the user equipment, and determine that the base station last accessed by the user equipment is in the non-overload state if the link parameter value of the link is greater than a link parameter threshold, or determine, according to a non-overload notification message reported by the base station last accessed by the user equipment, that the base station last accessed by the user equipment is in the non-overload state.

Optionally, the MME 9 further includes a first traffic control module 96 configured to determine that the base station last accessed by the user equipment is in an overload state, and perform a traffic control operation on the base station last accessed by the user equipment, or a second traffic control module 97 configured to perform a traffic control operation on the base station last accessed by the user equipment when the parameter value of the load parameter of the base station last accessed by the user equipment is greater than a first parameter threshold, and cancel the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

The MME 9 according to this embodiment of the present disclosure is used to execute the user equipment paging method described in method Embodiment 4. This embodiment of the present disclosure is based on a same concept as method Embodiment 4, and also brings same technical effects. For a specific process, refer to the description in method Embodiment 4, and details are not described herein again.

Figure 10:
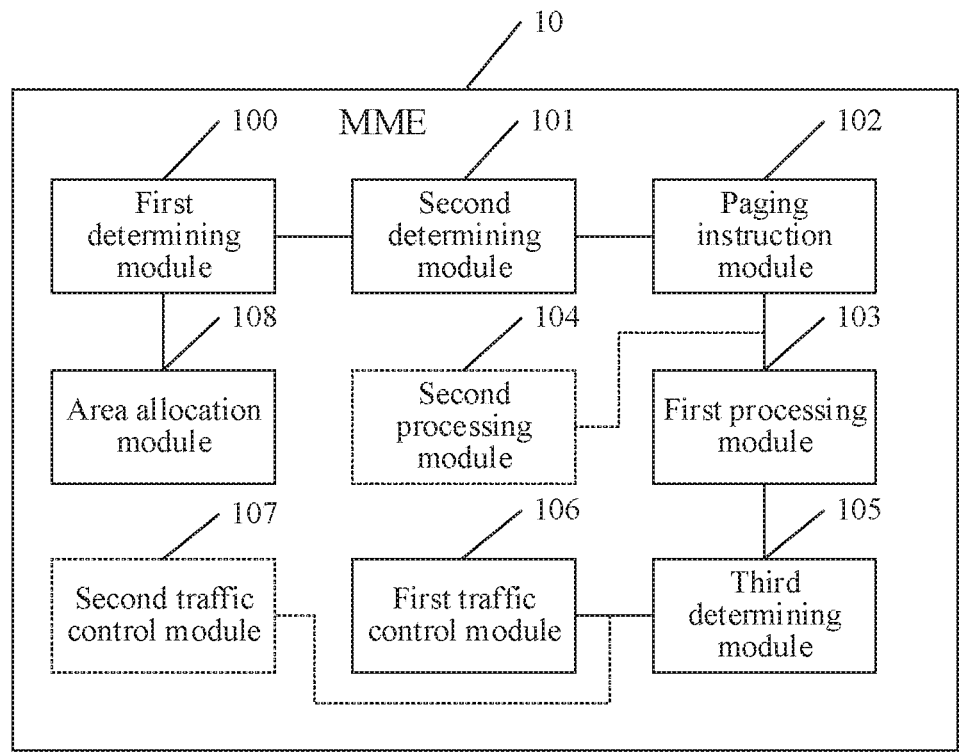
FIG. 10 is a schematic structural diagram of an MME according to Embodiment 3 of the present disclosure.

Referring to FIG. 10, FIG. 10 is a schematic structural diagram of a MME 10 according to Embodiment 3 of the present disclosure. In this embodiment of the present disclosure, the MME 10 includes a first determining module 100, a second determining module 101, and a paging instruction module 102.

The first determining module 100 is configured to determine a tracking area last accessed by the user equipment before user equipment in an idle state is paged.

The second determining module 101 is configured to determine that a type of the tracking area last accessed by the user equipment is a preset area type.

The paging instruction module 102 is configured to send a paging message including an identifier of the user equipment to all base stations corresponding to the tracking area last accessed by the user equipment.

The MME 10 according to this embodiment of the present disclosure is used to execute the user equipment paging method described in method Embodiment 5. This embodiment of the present disclosure is based on a same concept as method Embodiment 5, and also brings same technical effects. For a specific process, refer to the description in method Embodiment 5, and details are not described herein again.

Further, optionally, in this embodiment of the present disclosure, in addition to the first determining module 100, the second determining module 101, and the paging instruction module 102, the 10 further includes a first processing module 103 configured to determine that the user equipment is paged successfully when a service request message is received within a preset time, or a second processing module 104 configured to determine that the user equipment fails to be paged, and send a paging message including the identifier of the user equipment to all base stations corresponding to a tracking area list of the user equipment when no service request message is received within a preset time, where the service request message is used to request establishment of a downlink tunnel for the user equipment.

Optionally, the MME 10 further includes a third determining module 105 configured to determine that a base station last accessed by the user equipment is in a non-overload state and instruct the second determining module 101 to start working.

Further, optionally, the third determining module 105 is configured to monitor a parameter value of a load parameter of the base station last accessed by the user equipment, and determine that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitor a link parameter value of a link between the MME and the base station last accessed by the user equipment, and determine that the base station last accessed by the user equipment is in the non-overload state if the link parameter value of the link is greater than a link parameter threshold, or determine, according to a non-overload notification message reported by the base station last accessed by the user equipment, that the base station last accessed by the user equipment is in the non-overload state.

Optionally, the MME 10 further includes a first traffic control module 106 configured to determine that the base station last accessed by the user equipment is in an overload state, and perform a traffic control operation on the base station last accessed by the user equipment, or a second traffic control module 107 configured to perform a traffic control operation on the base station last accessed by the user equipment when the parameter value of the load parameter of the base station last accessed by the user equipment is greater than a first parameter threshold, and after performing the traffic control operation on the base station last accessed by the user equipment, when the parameter value of the load parameter of the base station last accessed by the user equipment is less than a second parameter threshold, cancel the traffic control operation performed on the base station last accessed by the user equipment, where the second parameter threshold is less than the first parameter threshold, and the first parameter threshold is less than the maximum value of the processing capability parameter of the base station last accessed by the user equipment.

Optionally, in this embodiment of the present disclosure, the MME 10 further includes an area allocation module 108 configured to allocate the tracking area list to the user equipment, where all tracking areas in the tracking area list are of a same area type.

The MME 10 according to this embodiment of the present disclosure is used to execute the user equipment paging method described in method Embodiment 6. This embodiment of the present disclosure is based on a same concept as method Embodiment 6, and also brings same technical effects. For a specific process, refer to the description in method Embodiment 6, and details are not described herein again.

Figure 11:
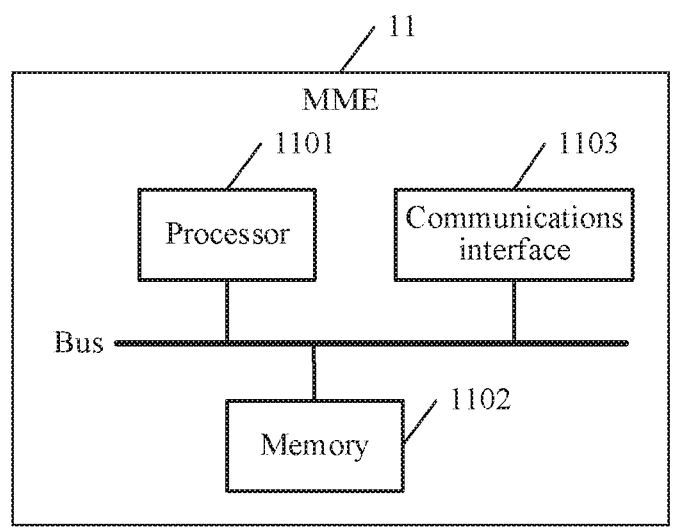
FIG. 11 is a schematic structural diagram of an entity apparatus of an MME according to an embodiment of the present disclosure.

Referring to FIG. 11, FIG. 11 is a schematic structural diagram of an entity apparatus of an MME 11 according to an embodiment of the present disclosure. The entity apparatus is used to implement the user equipment paging method in method Embodiment 1 and method Embodiment 2 of the present disclosure. The MME 11 includes a processor 1101, a memory 1102, and a communications interface 1103. The MME 11 may have one or more processors 1101. One processor is used as an example in FIG. 11. In some embodiments of the present disclosure, the processor 1101, the memory 1102, and the communications interface 1103 may be connected using a bus or in another manner. A connection using a bus is used as an example in FIG. 11.

The memory 1102 stores a set of program code, and the processor 1101 is configured to invoke the program code stored in the memory 1102 to perform the operations of determining a base station last accessed by the user equipment before paging user equipment in an idle state, determining that the base station last accessed by the user equipment is in a non-overload state, and sending a paging message including an identifier of the user equipment to the base station last accessed by the user equipment.

In this embodiment of the present disclosure, the processor 1101 is further configured to perform determining that the user equipment is paged successfully when a service request message sent by the base station last accessed by the user equipment is received within a preset time, or determining that the user equipment fails to be paged, and sending a paging message including the identifier of the user equipment to all base stations corresponding to a tracking area list of the user equipment when no service request message sent by the base station last accessed by the user equipment is received within a preset time.

The service request message is used to request establishment of a downlink tunnel for the user equipment.

In this embodiment of the present disclosure, that the processor 1101 executes determining that the base station last accessed by the user equipment is in a non-overload state includes monitoring a parameter value of a load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring a link parameter value of a link between the MME and the base station last accessed by the user equipment, and determining that the base station last accessed by the user equipment is in the non-overload state if the link parameter value of the link is greater than a link parameter threshold, or determining, according to a non-overload notification message reported by the base station last accessed by the user equipment, that the base station last accessed by the user equipment is in the non-overload state.

In this embodiment of the present disclosure, the processor 1101 is further configured to perform determining that the base station last accessed by the user equipment is in an overload state, and performing a traffic control operation on the base station last accessed by the user equipment, or performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

Referring to FIG. 11, FIG. 11 is a schematic structural diagram of an entity apparatus of an MME 11 according to an embodiment of the present disclosure. The entity apparatus is used to implement the user equipment paging methods in method Embodiment 3 and method Embodiment 4 of the present disclosure. The MME 11 includes a processor 1101, a memory 1102, and a communications interface 1103. The MME 11 may have one or more processors 1101. One processor is used as an example in FIG. 11. In some embodiments of the present disclosure, the processor 1101, the memory 1102, and the communications interface 1103 may be connected using a bus or in another manner. A connection using a bus is used as an example in FIG. 11.

The memory 1102 stores a set of program code, and the processor 1101 is configured to invoke the program code stored in the memory 1101 to perform the operations of determining a base station last accessed by the user equipment before paging user equipment in an idle state, determining that a type of the base station last accessed by the user equipment is a preset base station type, and sending a paging message including an identifier of the user equipment to the base station last accessed by the user equipment.

In this embodiment of the present disclosure, the processor 1101 is further configured to perform determining that the user equipment is paged successfully when a service request message sent by the base station last accessed by the user equipment is received within a preset time, or determining that the user equipment fails to be paged, and sending a paging message including the identifier of the user equipment to all base stations corresponding to a tracking area list of the user equipment when no service request message sent by the base station last accessed by the user equipment is received within a preset time.

The service request message is used to request establishment of a downlink tunnel for the user equipment.

In this embodiment of the present disclosure, before executing determining that a type of the base station last accessed by the user equipment is a preset base station type, the processor 1101 is further configured to perform determining that the base station last accessed by the user equipment is in a non-overload state.

In this embodiment of the present disclosure, that the processor 1101 executes determining that the base station last accessed by the user equipment is in a non-overload state includes monitoring a parameter value of a load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring a link parameter value of a link between the MME and the base station last accessed by the user equipment, and determining that the base station last accessed by the user equipment is in the non-overload state if the link parameter value of the link is greater than a link parameter threshold, or determining, according to a non-overload notification message reported by the base station last accessed by the user equipment, that the base station last accessed by the user equipment is in the non-overload state.

In this embodiment of the present disclosure, the processor 1101 is further configured to perform determining that the base station last accessed by the user equipment is in an overload state, and performing a traffic control operation on the base station last accessed by the user equipment, or performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

Referring to FIG. 11, FIG. 11 is a schematic structural diagram of an entity apparatus of an MME 11 according to an embodiment of the present disclosure. The entity apparatus is used to implement the user equipment paging methods in method Embodiment 5 and method Embodiment 6 of the present disclosure. The MME 11 includes a processor 1101, a memory 1102, and a communications interface 1103. The MME 11 may have one or more processors 1101. One processor is used as an example in FIG. 11. In some embodiments of the present disclosure, the processor 1101, the memory 1102, and the communications interface 1103 may be connected using a bus or in another manner. A connection using a bus is used as an example in FIG. 11.

The memory 1102 stores a set of program code, and the processor 1101 is configured to invoke the program code stored in the memory 1102 to perform the operations of determining a tracking area last accessed by the user equipment before paging user equipment in an idle state, determining that a type of the tracking area last accessed by the user equipment is a preset area type, and sending a paging message including an identifier of the user equipment to all base stations corresponding to the tracking area last accessed by the user equipment.

In this embodiment of the present disclosure, the processor 1101 is further configured to perform determining that the user equipment is paged successfully when a service request message is received within a preset time, or determining that the user equipment fails to be paged, and sending a paging message including the identifier of the user equipment to all base stations corresponding to a tracking area list of the user equipment when no service request message is received within a preset time, where the service request message is used to request establishment of a downlink tunnel for the user equipment.

In this embodiment of the present disclosure, before executing determining that a type of the tracking area last accessed by the user equipment is a preset area type, the processor 1101 is further configured to perform determining that the base station last accessed by the user equipment is in a non-overload state.

In this embodiment of the present disclosure, that the processor 1101 executes determining that the base station last accessed by the user equipment is in a non-overload state includes monitoring a parameter value of a load parameter of the base station last accessed by the user equipment, and determining that the base station last accessed by the user equipment is in the non-overload state if the parameter value of the load parameter is not greater than a load parameter threshold, where the load parameter threshold is less than a maximum value of a processing capability parameter of the base station last accessed by the user equipment, or monitoring a link parameter value of a link between the MME and the base station last accessed by the user equipment, and determining that the base station last accessed by the user equipment is in the non-overload state if the link parameter value of the link is greater than a link parameter threshold, or determining, according to a non-overload notification message reported by the base station last accessed by the user equipment, that the base station last accessed by the user equipment is in the non-overload state.

In this embodiment of the present disclosure, the processor 1101 is further configured to perform determining that the base station last accessed by the user equipment is in an overload state, and performing a traffic control operation on the base station last accessed by the user equipment, or performing a traffic control operation on the base station last accessed by the user equipment when the parameter value of the load parameter of the base station last accessed by the user equipment is greater than a first parameter threshold, and canceling the traffic control operation performed on the base station last accessed by the user equipment after performing the traffic control operation on the base station last accessed by the user equipment, when the parameter value of the load parameter of the base station last accessed by the user equipment is less than a second parameter threshold, where the second parameter threshold is less than the first parameter threshold, and the first parameter threshold is less than the maximum value of the processing capability parameter of the base station last accessed by the user equipment.

In this embodiment of the present disclosure, the processor 1101 is further configured to perform allocating the tracking area list to the user equipment, where all tracking areas in the tracking area list are of a same area type.

A person of ordinary skill in the art may understand that all or some of the processes of the methods in the embodiments may be implemented by a computer program instructing relevant hardware. The program may be stored in a computer readable storage medium. The processes of the methods in the embodiments are performed when the program runs. The foregoing storage medium may include a magnetic disk, an optical disc, a read-only memory (ROM), or a random access memory (RAM).

What is disclosed above is merely examples of the embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

What is claimed is:

1. A user equipment paging method, comprising:
determining, by a mobility management entity (MME) before paging user equipment in an idle state, a base station last accessed by the user equipment;
determining, by the MME, that the base station last accessed by the user equipment is in a non-overload state;
sending, by the MME, a paging message comprising an identifier of the user equipment to the base station last accessed by the user equipment;
performing a traffic control operation on the base station last accessed by the user equipment when a parameter value of a load parameter of the base station last accessed by the user equipment is greater than a first parameter threshold;

cancelling the traffic control operation performed on the base station last accessed by the user equipment after performing the traffic control operation on the base station last accessed by the user equipment; and
cancelling the traffic control operation performed on the base station last accessed by the user equipment when the parameter value of the load parameter of the base station last accessed by the user equipment is less than a second parameter threshold,
wherein the second parameter threshold is less than the first parameter threshold, and
wherein the first parameter threshold is less than a maximum value of a processing capability parameter of the base station last accessed by the user equipment.

2. The method of claim 1, further comprising:
determining, by the MME, that the user equipment is paged successfully when a service request message from the base station last accessed by the user equipment is received within a preset time; and
determining, by the MME, that the user equipment fails to be paged, and sending the paging message comprising the identifier of the user equipment to all base stations corresponding to a tracking area list of the user equipment when no service request message from the base station last accessed by the user equipment is received within the preset time, and
wherein the service request message requests establishment of a downlink tunnel for the user equipment.

3. The method of claim 1, wherein determining that the base station last accessed by the user equipment is in the non-overload state comprises:
monitoring, by the MME, a link parameter value of a link between the MME and the base station last accessed by the user equipment; and
determining that the base station last accessed by the user equipment is in the non-overload state when the link parameter value of the link is greater than a link parameter threshold.

4. A user equipment paging method, comprising:
determining, by a mobility management entity (MME) before paging user equipment in an idle state, a base station or a tracking area last accessed by the user equipment;
determining, by the MME, that the base station last accessed by the user equipment is in a non-overload state;
determining, by the MME, that a type of the base station or a type of the tracking area last accessed by the user equipment is a preset base station type or a preset area type;
sending, by the MME, a paging message comprising an identifier of the user equipment to the base station or all base stations corresponding to the tracking area last accessed by the user equipment;
performing a traffic control operation on the base station last accessed by the user equipment when a parameter value of a load parameter of the base station last accessed by the user equipment is greater than a first parameter threshold;
cancelling the traffic control operation performed on the base station last accessed by the user equipment after performing the traffic control operation on the base station last accessed by the user equipment; and
cancelling the traffic control operation performed on the base station last accessed by the user equipment when the parameter value of the load parameter of the base station last accessed by the user equipment is less than a second parameter threshold,
wherein the second parameter threshold is less than the first parameter threshold, and
wherein the first parameter threshold is less than a maximum value of a processing capability parameter of the base station last accessed by the user equipment.

5. The method of claim 4, further comprising:
determining, by the MME, that the user equipment is paged successfully when a service request message is received within a preset time; and
determining, by the MME, that the user equipment fails to be paged, and sending the paging message comprising the identifier of the user equipment to all base stations corresponding to a tracking area list of the user equipment when no service request message is received within the preset time, and
wherein the service request message requests establishment of a downlink tunnel for the user equipment.

6. The method of claim 4, wherein determining that the base station last accessed by the user equipment is in the non-overload state comprises:
monitoring, by the MME, a link parameter value of a link between the MME and the base station last accessed by the user equipment; and
determining that the base station last accessed by the user equipment is in the non-overload state when the link parameter value of the link is greater than a link parameter threshold.

7. The method of claim 4, wherein before determining the tracking area last accessed by the user equipment, the method further comprises allocating, by the MME, the tracking area list to the user equipment, and wherein all tracking areas in the tracking area list are of a same area type.

8. A mobility management entity (MME), comprising:
a memory configured to store a set of program code; and
a processor coupled to the memory, wherein the set of program code causes the processor to be configured to:
determine a base station last accessed by user equipment in an idle state before paging the user equipment;
determine that the base station last accessed by the user equipment is in a non-overload state;
send a paging message comprising an identifier of the user equipment to the base station last accessed by the user equipment;
perform a traffic control operation on the base station last accessed by the user equipment when a parameter value of a load parameter of the base station last accessed by the user equipment is greater than a first parameter threshold;
cancel the traffic control operation performed on the base station last accessed by the user equipment after performing the traffic control operation on the base station last accessed by the user equipment; and
cancel the traffic control operation performed on the base station last accessed by the user equipment when the parameter value of the load parameter of the base station last accessed by the user equipment is less than a second parameter threshold,
wherein the second parameter threshold is less than the first parameter threshold, and
wherein the first parameter threshold is less than a maximum value of a processing capability parameter of the base station last accessed by the user equipment.

9. The MME of claim 8, wherein the set of program code further causes the processor to be configured to:
- determine that the user equipment is paged successfully when a service request message from the base station last accessed by the user equipment is received within a preset time; and
- determine that the user equipment fails to be paged, and send the paging message comprising the identifier of the user equipment to all base stations corresponding to a tracking area list of the user equipment when no service request message from the base station last accessed by the user equipment is received within the preset time, and
- wherein the service request message requests establishment of a downlink tunnel for the user equipment.

10. The MME of claim 8, wherein the base station last accessed by the user equipment is in the non-overload state, and wherein the set of program code further causes the processor to be configured to:
- monitor a link parameter value of a link between the MME and the base station last accessed by the user equipment; and
- determine that the base station last accessed by the user equipment is in the non-overload state when the link parameter value of the link is greater than a link parameter threshold.

11. A mobility management entity (MME), comprising:
a memory configured to store a set of program code; and
a processor coupled to the memory, wherein the set of program code causes the processor to be configured to:
- determine a base station or a tracking area last accessed by user equipment in an idle state before paging the user equipment;
- determine that the base station last accessed by the user equipment is in a non-overload state;
- determine that a type of the base station or a type of the tracking area last accessed by the user equipment is a preset base station type or a preset area type;
- send a paging message comprising an identifier of the user equipment to the base station or all base stations corresponding to the tracking area last accessed by the user equipment;
- perform a traffic control operation on the base station last accessed by the user equipment when a parameter value of a load parameter of the base station last accessed by the user equipment is greater than a first parameter threshold;
- cancel the traffic control operation performed on the base station last accessed by the user equipment after performing the traffic control operation on the base station last accessed by the user equipment; and
- cancel the traffic control operation performed on the base station last accessed by the user equipment after performing the traffic control operation on the base station last accessed by the user equipment when the parameter value of the load parameter of the base station last accessed by the user equipment is less than a second parameter threshold,
- wherein the second parameter threshold is less than the first parameter threshold, and
- wherein the first parameter threshold is less than a maximum value of a processing capability parameter of the base station last accessed by the user equipment.

12. The MME of claim 11, wherein the set of program code further causes the processor to be configured to:
- determine that the user equipment is paged successfully when a service request message is received within a preset time; and
- determine that the user equipment fails to be paged, and send the paging message comprising the identifier of the user equipment to all base stations corresponding to a tracking area list of the user equipment when no service request message is received within the preset time, and
- wherein the service request message requests establishment of a downlink tunnel for the user equipment.

13. The MME of claim 11, wherein the base station last accessed by the user equipment is in the non-overload state, and wherein the set of program code further causes the processor to be configured to:
- monitor a link parameter value of a link between the MME and the base station last accessed by the user equipment; and
- determine that the base station last accessed by the user equipment is in the non-overload state when the link parameter value of the link is greater than a link parameter threshold.

14. The MME of claim 11, wherein the set of program code further causes the processor to be configured to allocate a tracking area list to the user equipment, and wherein all tracking areas in the tracking area list are of a same area type.

* * * * *